US009071606B2

(12) United States Patent
Braun et al.

(10) Patent No.: US 9,071,606 B2
(45) Date of Patent: Jun. 30, 2015

(54) MANAGING CLOUD SERVICE WITH COMMUNITY INVITATIONS

(71) Applicant: Meetrix Communication, Inc., Santa Monica, CA (US)

(72) Inventors: James Braun, Wichita, KS (US); Jebb Dykstra, Santa Monica, CA (US)

(73) Assignee: MEETRIX COMMUNICATIONS, INC., Santa Monica, CA (US)

( * ) Notice: Subject to any disclaimer, the term of this patent is extended or adjusted under 35 U.S.C. 154(b) by 279 days.

(21) Appl. No.: 13/802,180

(22) Filed: Mar. 13, 2013

(65) Prior Publication Data

US 2014/0280932 A1    Sep. 18, 2014

(51) Int. Cl.
*G06F 15/16*    (2006.01)
*H04L 29/06*    (2006.01)

(52) U.S. Cl.
CPC ............. *H04L 63/10* (2013.01); *H04L 63/104* (2013.01)

(58) Field of Classification Search
CPC .............. H04L 29/06; H04L 29/08072; H04L 29/0809; H04L 29/08144; H04L 63/08
USPC .......................................................... 709/225
See application file for complete search history.

(56) References Cited

U.S. PATENT DOCUMENTS

| | | | |
|---|---|---|---|
| 6,708,187 B1 | 3/2004 | Shanumgam et al. | |
| 8,769,622 B2 | 7/2014 | Chang et al. | |
| 2007/0179793 A1 | 8/2007 | Bagchi et al. | |
| 2009/0249440 A1* | 10/2009 | Platt et al. | 726/1 |
| 2011/0047540 A1* | 2/2011 | Williams et al. | 717/178 |
| 2012/0278439 A1* | 11/2012 | Ahiska et al. | 709/218 |
| 2013/0007845 A1 | 1/2013 | Chang et al. | |
| 2013/0054976 A1* | 2/2013 | Brown et al. | 713/189 |
| 2014/0075501 A1* | 3/2014 | Srinivasan et al. | 726/1 |
| 2014/0075565 A1* | 3/2014 | Srinivasan et al. | 726/26 |
| 2014/0149494 A1* | 5/2014 | Markley et al. | 709/203 |
| 2014/0189124 A1 | 7/2014 | Banatwala et al. | |

* cited by examiner

*Primary Examiner* — Philip Chea
*Assistant Examiner* — Wuji Chen
(74) *Attorney, Agent, or Firm* — Michael A. Kerr; Kerr IP Group, LLC

(57) ABSTRACT

An illustrative system for managing a plurality of cloud services that includes a first cloud service, a second cloud service, a relational database, a cloud management console, a global user profile, an invitation, and a synchronization module. Each cloud service includes an LDAP directory configured to manage end users accessing the corresponding cloud service. The relational database is communicatively coupled to each LDAP directory. The cloud management console manages the relational database, which identifies a maximum number of end users that can access each cloud service and an end date for accessing each cloud service. The global user profile is stored on the relational database. The invitation communicated from the cloud management console enables an end user to access the cloud service. The synchronization module enables the relational database to synchronize with each of the LDAP directories according to each end user's accepted invitations.

20 Claims, 16 Drawing Sheets

MANAGING CLOUD SERVICE WITH COMMUNITY INVITATIONS

CROSS-REFERENCE

This patent application claims the benefit of patent application Ser. No. 13/802,155 filed Mar. 13, 2013 and entitled CONTROLLING ACCESS TO ENTERPRISE SOFTWARE, which is hereby incorporated by reference in this patent application.

FIELD

The present invention relates to a system and method for managing cloud services with community invitations. More particularly, the invention relates to a system for managing cloud services with a database and invitations communicated to selected end users.

BACKGROUND

The migration to cloud computing for enterprise solutions has created some unique challenges that relate to managing "per seat licenses." For example, a 50-user per-seat license allows up to 50 individually named end users to access the program.

Generally, per seat licensing is managed by a System Administrator and administered by providing specific end users with access to the software. Typically, monitoring software is used to determine the number of end users accessing the software.

There are various limitations associated with the System Administrator controlling or managing the per seat licensing in a cloud based enterprise software implementation. For example, the System Administrator (SA) must determine which end users are going to access the licensed software; and since it takes time to communicate with each end user about software usage, the SA generally issues a seat license to individuals or groups that the SA believes would use the software. The result ineffectively issues licenses to end users. On the other hand, the SA may speak directly with end users and end users may express an interest in the enterprise software, but may never use or access the software.

From the end user perspective, a particular end user may be unable to access the software because the SA has determined that other end users are entitled to access the software. Additionally, there may be circumstances when an end user may only need to use the software for a particular time period. After the time period is completed there is no need to access the software; so the licensee is effectively not optimizing the per seat license by not being able to transfer a per seat license from one end user to another end user.

SUMMARY

A system for managing a plurality of cloud services is described. The system includes a first cloud service, a first per seat license, a second cloud service, a second per seat license, a database, a global user profile, an invitation, and a synchronization module. The first cloud service includes a first LDAP directory that manages end users accessing the first cloud service. The first per seat license is associated with the first cloud service and includes a first upper limit of end users that can access the first cloud service and a first end date for the first per seat license. The second cloud service includes a second LDAP directory configured to manage users' access to the second cloud service. The second per seat license to the second cloud service includes a second upper limit of end users that can access the second cloud service and a second end date for the second per seat license. The database is communicatively coupled to the first LDAP directory and the second LDAP directory. The global user profile is stored on the database. The global user profile includes data fields that can be communicated to at least one of the first cloud service and the second cloud service. An invitation can be communicated from at least one Administrator to an end user, wherein the invitation enables the end user to access at least one of the first cloud service and second cloud service when the end user accepts the invitation. The synchronization module enables the database to synchronize with each of the LDAP directories according to end users' accepted invitations to at least one of the first per seat license and the second per seat license.

In the illustrative embodiment, the system for managing cloud services may also include an Organizational Unit that is established by the Administrator, wherein the Organizational Unit includes a plurality of end users that have permission to access at least one of the first cloud service and the second cloud service. Also, the system may include a cloud management console that enables the Administrator to control the database and the Organizational Unit so that the Administrator can communicate a plurality of invitations to the Organizational Unit. The system for managing cloud services may also include a first-tier Administrator that identifies a community and an upper limit of users that can belong to the community, and a second-tier Administrator that is selected by the first-tier Administrator, wherein the second-tier Administrator is capable of creating at least one Organizational Unit that is a subset of the end users within the community. In one embodiment, the second-tier Administrator communicates the invitations to the Organizational Unit. Additionally, the accepted invitation may trigger communicating the global user profile data fields stored on the database to at least one of the first LDAP directory and the second LDAP directory. Furthermore, the system may enable the Administrator to remove end users from the community, when the end user does not accept an invitation communicated from the Administrator to the end user.

Another illustrative system for managing a plurality of cloud services includes a first cloud service, a second cloud service, a relational database, a cloud management console, a global user profile, an invitation, and a synchronization module. The first cloud service includes a first LDAP directory configured to manage end users accessing the first cloud service. The second cloud service includes a second LDAP directory configured to manage users' access to the second cloud service. The relational database is communicatively coupled to the first LDAP directory for the first cloud service and the second LDAP directory for the second cloud service. The cloud management console manages the relational database, which identifies a maximum number of end users that can access each cloud service and an end date for accessing each cloud service. The global user profile is stored on the relational database. The global user profile includes data fields communicated by one of the first cloud service and the second cloud service. The invitation communicated from the cloud management console receives an input that enables an end user to access one of the first cloud service and the second cloud service. The synchronization module enables the relational database to synchronize with each of the LDAP directories according to each end user's accepted invitations to at least one of the first per seat license and the second per seat license.

The second illustrative system may also include an Organizational Unit that is established by an Administrator, wherein the Organizational Unit includes a plurality of end users that have permission to access at least one of the first cloud service and the second cloud service. Also, the cloud management console may be configured to enable the Administrator to control the relational database and the Organizational Unit so that the Administrator can communicate a plurality of invitations to the Organizational Unit. Additionally, the system for managing cloud services may include a first-tier Administrator that identifies a community and an upper limit of users that can belong to the community, and a second-tier Administrator that is selected by the first-tier Administrator, wherein the second-tier Administrator is capable of creating at least one Organizational Unit that is a subset of the end users within the community. The second-tier Administrator may also communicate the invitations to the Organizational Unit. Furthermore, the accepted invitations may trigger communicating the global user profile data fields stored on the database to at least one of the first LDAP directory and the second LDAP directory. Further still, the system for managing cloud services may enable the Administrator to remove end users from the community when the end user does not accept an invitation communicated from the Administrator to the end user.

A method of managing a plurality of cloud services for a plurality of end users is also presented. The method includes communicating an invitation from a cloud management console to the plurality of end users, wherein the invitation is configured to receive user input that enables an end user to access at least one of a first cloud service and a second cloud service. The method also includes managing end users' access to the first cloud service with a first LDAP directory that is associated with the first cloud service, and managing end users' access to the second cloud service with a second LDAP directory that is associated with the second cloud service. The method then proceeds to enable a relational database to be communicatively coupled to the first LDAP directory for the first cloud service and the second LDAP directory for the second cloud service. The relational database is controlled from a cloud management console, which identifies a maximum number of end users that can access each cloud service and an end date for accessing each cloud service. The method includes storing a global user profile on the relational database, wherein the global user profile includes a plurality of data fields configured to be communicated to at least one of the first cloud service and the second cloud service. The method then proceeds to synchronize the relational database with each of the LDAP directories according to end users' accepted invitations to at least one of the first per seat license and the second per seat license.

The method of managing cloud services may also include establishing an Organizational Unit that includes a plurality of end users that have permission to access at least one of the first cloud service and the second cloud service, wherein the Organizational Unit is set up by an Administrator. The cloud management console may also enable the Administrator to control the relational database and the Organizational Unit so that the Administrator can communicate a plurality of invitations to the Organizational Unit. Additionally, the method may include enabling a first-tier Administrator to identify a community and an upper limit of users that can belong to the community, and select a second-tier Administrator that is capable of creating at least one Organizational Unit that is a subset of the end users within the community. Furthermore, the second-tier Administrator may communicate the invitations to the Organizational Unit. Further still, the method of managing cloud services may include communicating the global user profile data fields stored on the database to at least one of the first LDAP directory and the second LDAP directory when the invitations is accepted by the end user.

FIGURES

The present invention will be more fully understood by reference to the following drawings which are for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure.

The self provisioning and on-boarding engine presented herein controls access to the enterprise software on a premises based server or running as a cloud service. Additionally, the self provisioning and on-boarding engine described herein controls access to the enterprise software or cloud service with a hierarchical network Administrator framework.

Furthermore, the self-provisioning and on-boarding engine presented herein also manages cloud services with a database and invitations communicated to selected end users. The "per seat licenses" for cloud based services is a software license based on the number of individual users who have access to enterprise software or cloud service(s).

The self-provisioning and on-boarding engine supports a provisioning system that includes a hierarchical network Administrator framework for managing per seat licensing. The hierarchical network Administrator is embodied in a Cloud Management Console (CMC). In general, the provisioning system is applied to one or more cloud based services and requires minimal management effort because the management is off loaded to end user and other Administrators controlling Organizational Units.

A variety of graphical user interfaces (UIs) are presented herein to describe the self-provisioning and on-boarding engine. The descriptions of these UIs are merely illustrative. Where "button," "drop down menu," "text box," "input box," and similar interface controls are described herein, it will be realized by those skilled in the art that other interface control elements may be used.

Figure 1:
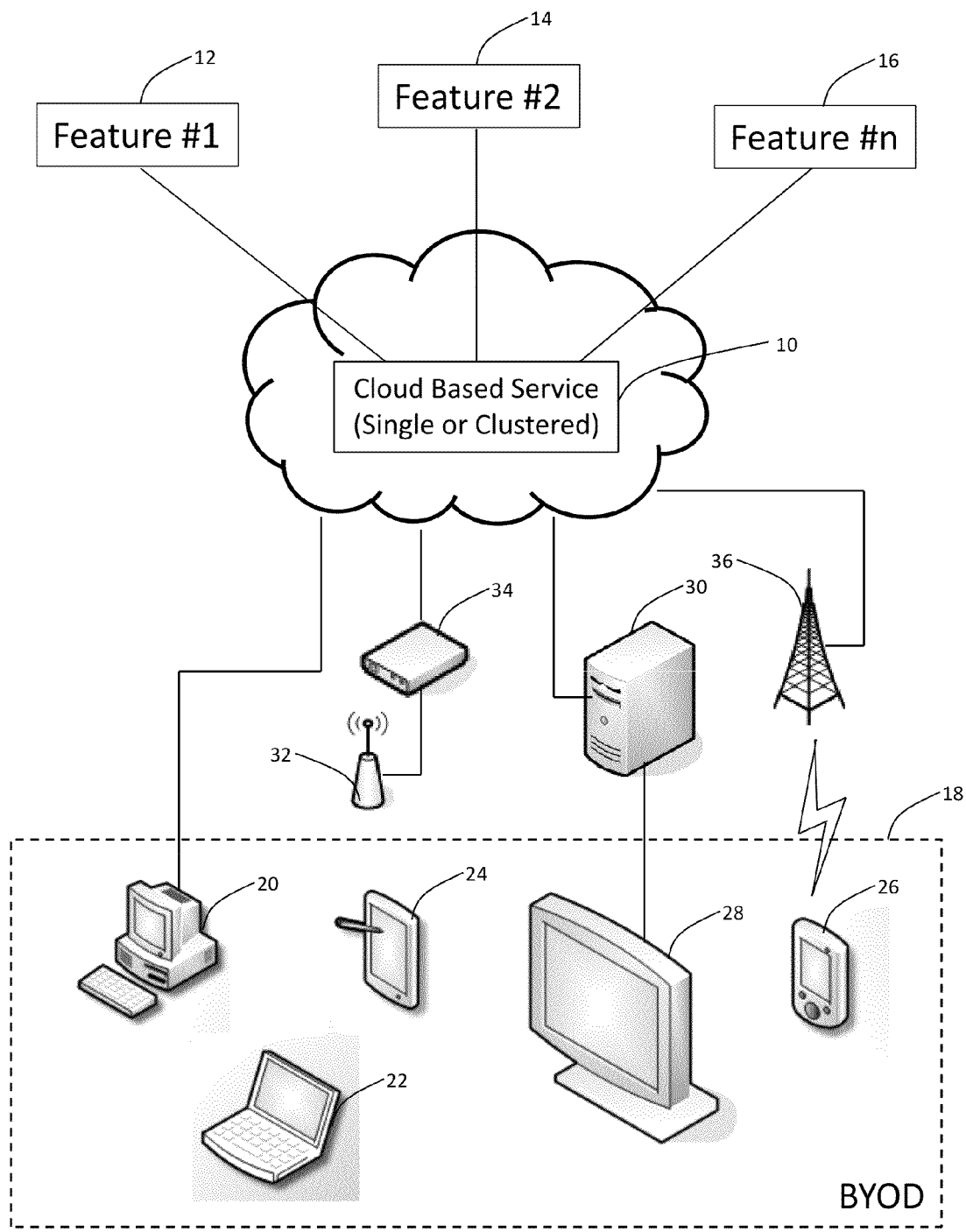
FIG. 1 shows an illustrative cloud based service.

Referring to FIG. 1 there is shown an illustrative prior art cloud based service offering. The illustrative cloud service 10 provides a variety of different features 12, 14 and 16 to the Bring Your Own Device (BYOD) client devices 18.

By way of example and not of limitation, the BYOD clients 18 include a personal computer 20, a laptop 22, a tablet computer 24, a smartphone 26, and a display 28 that has a wired connected to a networked computer 30. The BYOD clients may be operationally coupled to a wide area network (WAN) such as the Internet with a wireless connection. The wireless BYOD clients may be communicatively coupled to the WAN via a Wi-Fi (or Bluetooth) access point 32 that is communicatively coupled to an illustrative modem 34, which is communicatively coupled to the WAN. The wireless BYOD client may also be communicatively coupled to the WAN using a proprietary carrier network that includes illustrative communication tower 36.

The illustrative cloud service 10 may be embodied as one of four fundamental cloud service models, namely, infrastructure as a service (IaaS), platform as a service (PaaS), software as a service (SaaS), and network as a service (NaaS). The cloud service models are deployed using different types of cloud deployments that include a public cloud, a community cloud, a hybrid cloud, and a private cloud.

Infrastructure as a service (IaaS) is the most basic cloud service model. IaaS providers offer virtual machines and other resources. The virtual machines, also referred to as "instances," are run as guests by a hypervisor. Groups of hypervisors within the cloud operational support system support large numbers of virtual machines and the ability to scale services up and down according to customers' varying requirements. IaaS clouds often offer additional resources such as images in a virtual machine image library, raw (block) and file-based storage, firewalls, load balancers, IP addresses, virtual local area networks (VLANs), and software bundles. IaaS cloud providers supply these resources on demand from their large pools installed in data centers. For wide area connectivity, the Internet can be used or virtual private networks (VPNs) can be used.

Platform as a service (PaaS) enables cloud providers to deliver a computing platform that may include an operating system, a programming language execution environment, a database, and a web server. Application developers can develop and run their software solutions on the PaaS without the cost and complexity of buying and managing the underlying hardware and software layers. With some PaaS solutions, the system resources scale automatically to match application demand so the cloud end user does not have to allocate resources manually.

Software as a service (SaaS) enables cloud providers to install and operate application software in the cloud. Cloud end users access the software from cloud clients. The cloud end users do not manage the cloud infrastructure and platform that runs the application. The SaaS application is different from other applications because of scalability. Scalability can be achieved by cloning tasks onto multiple virtual machines at run-time to meet the changing work demand. Load balancers in the SaaS application distribute work over a set of virtual machines. To accommodate a large number of cloud end users, cloud applications may be multitenant and serve more than one cloud end user organization. Some SaaS solutions may be referred to as desktop as a service, business process as a service, test environment as a service, communication as a service, etc.

The fourth category of cloud services is Network as a service (NaaS), in which the capability provided to the cloud service end user is to use a network/transport connectivity services, an inter-cloud network connectivity services, or the combination of both. NaaS involves the optimization of resource allocations by considering network and computing resources as a unified whole and traditional NaaS services include flexible and extended VPN, and bandwidth on demand.

Cloud clients access cloud computing using networked client devices. The cloud clients include, but are not limited to, desktop computers 20, laptops 22, tablets 24 and smartphones 26. Some of these cloud clients rely on cloud computing for all or a majority of their applications so as to be essentially useless without it. Many cloud applications do not require specific software on the client device and instead use a web browser to interact with the cloud application. With Ajax and HTML5 web user interfaces can achieve a similar or even better look and feel as native applications. Some cloud applications, however, support specific client software dedicated to these applications.

There are different types of cloud deployment models for the cloud based service, which include a public cloud, a community cloud, a hybrid cloud, and a private cloud. In a public cloud, applications, storage, and other resources are made available to the general public by a service provider. These services are free or offer a pay-per-use model.

The community cloud infrastructure is between several organizations from a community with common concerns, and can be managed internally or by a third-party and hosted internally or externally; so the costs are spread over fewer users than a public cloud (but more than a private cloud).

The private cloud infrastructure is operated solely for a single organization, whether managed internally or by a third-party and hosted internally or externally. A private cloud project requires virtualizing the business environment, and it requires that the organization reevaluate decisions about existing resources.

The hybrid cloud is a composition of two or more clouds (private, community or public) that remain unique entities but are bound together, offering the benefits of multiple deployment models. Hybrid cloud architecture requires both on-premises resources and off-site (remote) server-based cloud infrastructure. Although hybrid clouds lack the flexibility, security and certainty of in-house applications, the hybrid cloud provides the flexibility of in-house applications with the fault tolerance and scalability of cloud based services.

In operation, there are presently two types of workloads that are supported by the cloud deployment models described above, namely, the "traditional" workloads and the "cloud era" workloads. Traditional workloads relate to existing enterprise applications developed by vendors such as IBM®, Polycom® Microsoft®, Oracle®, and SAP®. Generally, these applications are client-server applications that run on a single server or cluster of servers include a front-end application and server nodes that are supported by a database.

By way of example and not of limitation, the illustrative traditional workload described herein enables includes IBM's Lotus Sametime and Polycom's Unified Collaboration Solution. As described herein, the self-provisioning and on-boarding system includes a synchronization process that can be used to effectively manage billing and licensing for these traditional cloud services.

Additionally, the self-provisioning and on-boarding system includes a synchronization process that can be used to more effectively manage billing and licensing for cloud era workloads. Cloud era workloads do not depend on enterprise-grade server clusters, but on a large number of loosely coupled compute and storage nodes. Illustrative cloud era workloads include web and social media applications. In the illustrative embodiment presented herein, the same self-provisioning and on-boarding tools can be used to provide "global" access to cloud era workloads such as social media applications.

Figure 2:
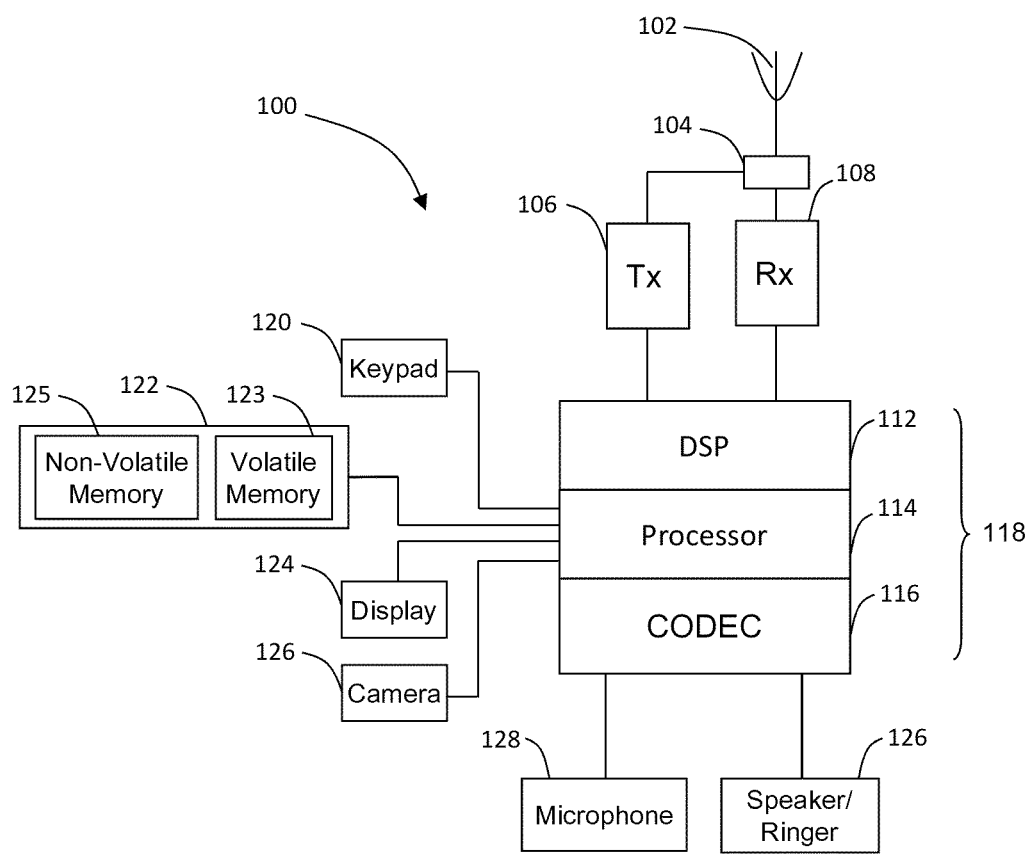
FIG. 2 shows an illustrative bring your own device (BYOD) client device.

Referring to FIG. 2 there is shown the electrical components for an illustrative wireless BYOD client 100. It shall be appreciated by those of ordinary skill in the art, that the term "BYOD" is used to describe the policy of permitting employees to bring personally owned mobile devices (laptops, tablets, and smart phones) to their place of work and use those devices to access privileged company information and applications.

For purposes of this patent, the illustrative BYOD client 100 is a multimode wireless device that comprises a first antenna element 102 that is operatively coupled to a duplexer 104, which is operatively coupled to a multimode transmitter module 106, and a multimode receiver module 108.

An illustrative control module 118 comprises a digital signal processor (DSP) 112, a processor 114, and a CODEC 116 that are communicatively coupled to the transmitter 106 and receiver 108. It shall be appreciated by those of ordinary skill in the art that the transmitter module and receiver module are typically paired and may be embodied as a transceiver. The illustrative transmitter 106, receiver 108, or transceiver is communicatively coupled to antenna element 102.

The DSP 112 may be configured to perform a variety of operations such as controlling the antenna 102, the multimode transmitter module 106, and the multimode receiver module 108. The processor 114 is operatively coupled to a keypad 120, a memory 122, a display 124, and camera 126. Additionally, the processor 114 is also operatively coupled to the CODEC module 116 that performs the encoding and decoding operations and is communicative coupled to a speaker or ringer 126, and a microphone 128. The CODEC module 116 is also communicatively coupled to the display 124 and provides the encoding and decoding operations for video.

The memory 122 includes two different types of memory, namely, volatile memory 123 and non-volatile memory 125. The volatile memory 123 is computer memory that requires power to maintain the stored information such as random access memory (RAM) shown in FIG. 3. By way of example and not of limitation, images presented in preview mode would use the storage resources corresponding to the volatile memory 123. The non-volatile memory 125 can retain stored information even when the wireless communication device 100 is not powered up. Some illustrative examples of non-volatile memory 125 include flash memory, ROM memory, and hard drive memory. In the illustrative embodiment, the captured image is processed using a volatile memory 123 and stored in the non-volatile memory 125.

Wireless device 100 may be a mobile handset, mobile phone, wireless phone, portable cell phone, cellular phone, portable phone, a personal digital assistant (PDA), a tablet, a portable media device, or any type of mobile terminal which is regularly carried by an end user and has all the elements necessary for operation in a wireless communication system. The wireless communications include, by way of example and not of limitation, CDMA, WCDMA, GSM or UMTS or any other wireless communication system such as wireless local area network (WLAN), Wi-Fi or WiMAX. The wireless device comprises a device content interface. The device content interface is a graphical user interface that displays content on a display of the wireless device. The device content interface may also be configured to receive end user input, such as feedback pertaining to the displayed content and user-created content. The device content interface may be an application running on a processor of the wireless device. In other embodiments, the device content interface is accessed via network, for example, using an internet browser application running on a processor of the wireless device.

Figure 3:
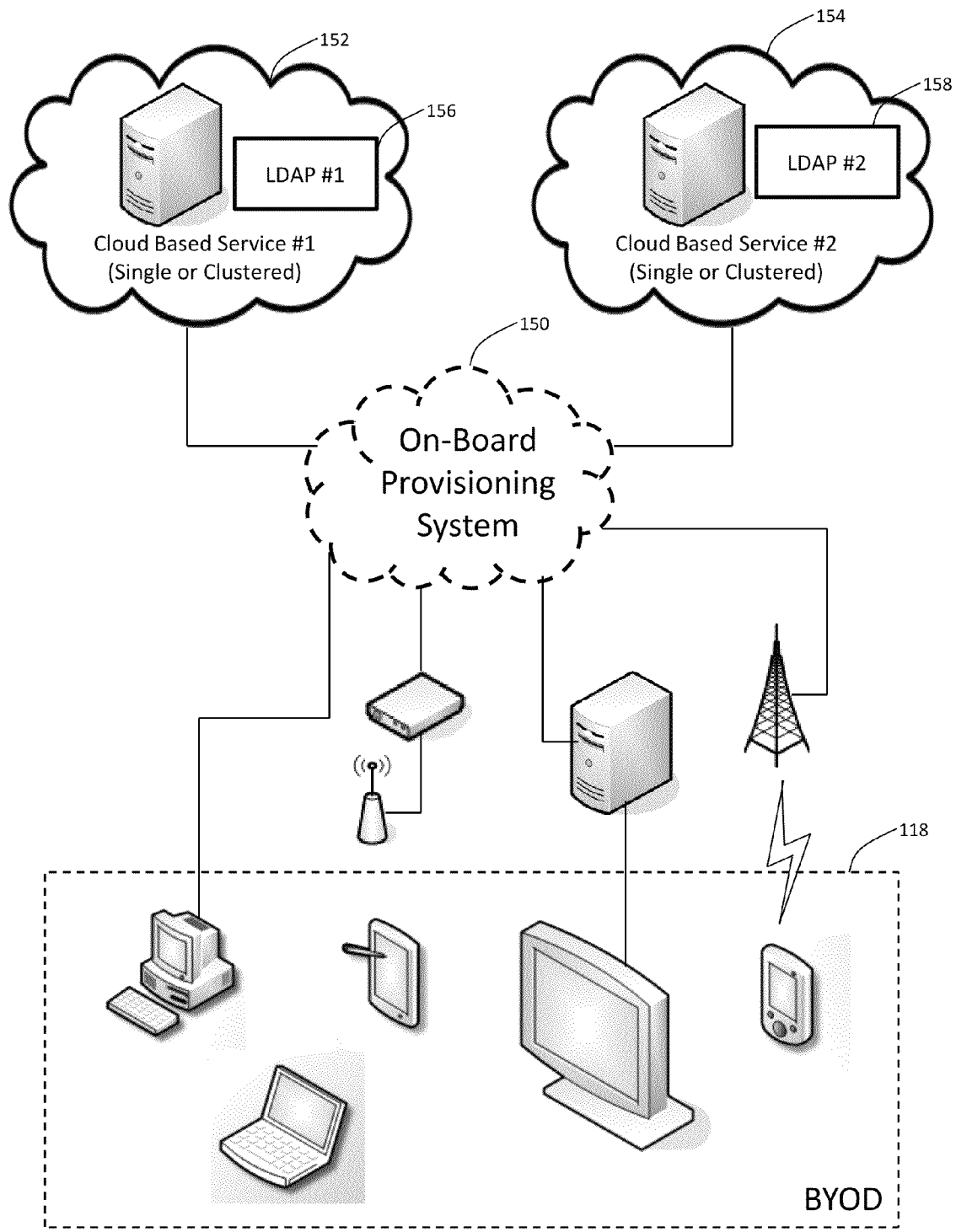
FIG. 3 shows an illustrative self-provisioning and on-boarding engine.

Referring to FIG. 3, there is shown an illustrative on-board provisioning system 150 that is configured to communicate with either cloud based service #1 152, cloud based service #2 154, or the combination of both cloud services. More particularly, the on-board provisioning system 150 includes a self-provisioning system, an on-boarding engine, and synchronization module that can be used to control and manage a plurality of cloud services.

The self-provisioning system allows end users to set up and launch the cloud services without direction interventions from the System Administrator (SA). The self-provisioning system presented herein can be applied to public, private and hybrid cloud deployments.

The on-boarding engine refers to bringing premises-based enterprise services to one of the public, private and cloud deployments. For example, the illustrative on-boarding engine is configured to provide a "back-end" billing solution and a self-provisioning "front end." More particularly, the illustrative on-board provisioning system 150 may be used to provision conference rooms for a unified communications service such as IBM® SameTime.

More generally, a legacy software solution may be converted to a cloud service with a web-based front end that would interface with the on-board provisioning system that further provides a cloud infrastructure for managing billing and virtual machines. The on-board provisioning engine may also provide a cloud storage service that may include a database for managing and controlling cloud based licensing. More generally, the on-board provisioning engine is configured to provide support for the cloud service.

In addition to IBM® SameTime, other cloud services supported by the on-board provisioning system 150 may be applied to other unified communications system from Polycom® and BroadSoft®. The on-board provisioning system 150 may also be applied to cloud services such as Customer Relations Management (CRM) services and Enterprise Resource Planning (ERP) services. Other cloud based services that may be supported by the self-provisioning system, on-boarding engine, and synchronization module include cloud services related to human resources, financial reporting, command and control (SCADA), business analytics, enterprise social networks, electronic medical records and business intelligence, or intranet style applications where authentication is required.

In FIG. 3, the cloud service #1 152 and cloud service #2 includes their own respective LDAP directory service 156 and 158, respectively. The on-board provisioning system 150 is configured to interface with LDAP directory services 156 and 158.

The Lightweight Directory Access Protocol (LDAP) is an open application protocol for accessing and maintaining distributed directory information services over an Internet Protocol (IP) network. There are many LDAP directory service offerings. The LDAP protocol uses a client-server model, in which the LDAP servers make information about people, organizations, and resources accessible to LDAP clients. The LDAP protocol defines operations that clients use to search and update the directory. An LDAP client can perform a variety of operations including searching and retrieving entries from the directory, adding new entries in the directory, updating entries in the directory, deleting entries in the directory, and renaming entries in the directory.

Most cloud services support the use of external LDAP servers per site for end user authentication. Typically, cloud service accounts are mapped to an external LDAP account and the Administrator provisioning the external LDAP is performed separately from the cloud service.

Figure 4:
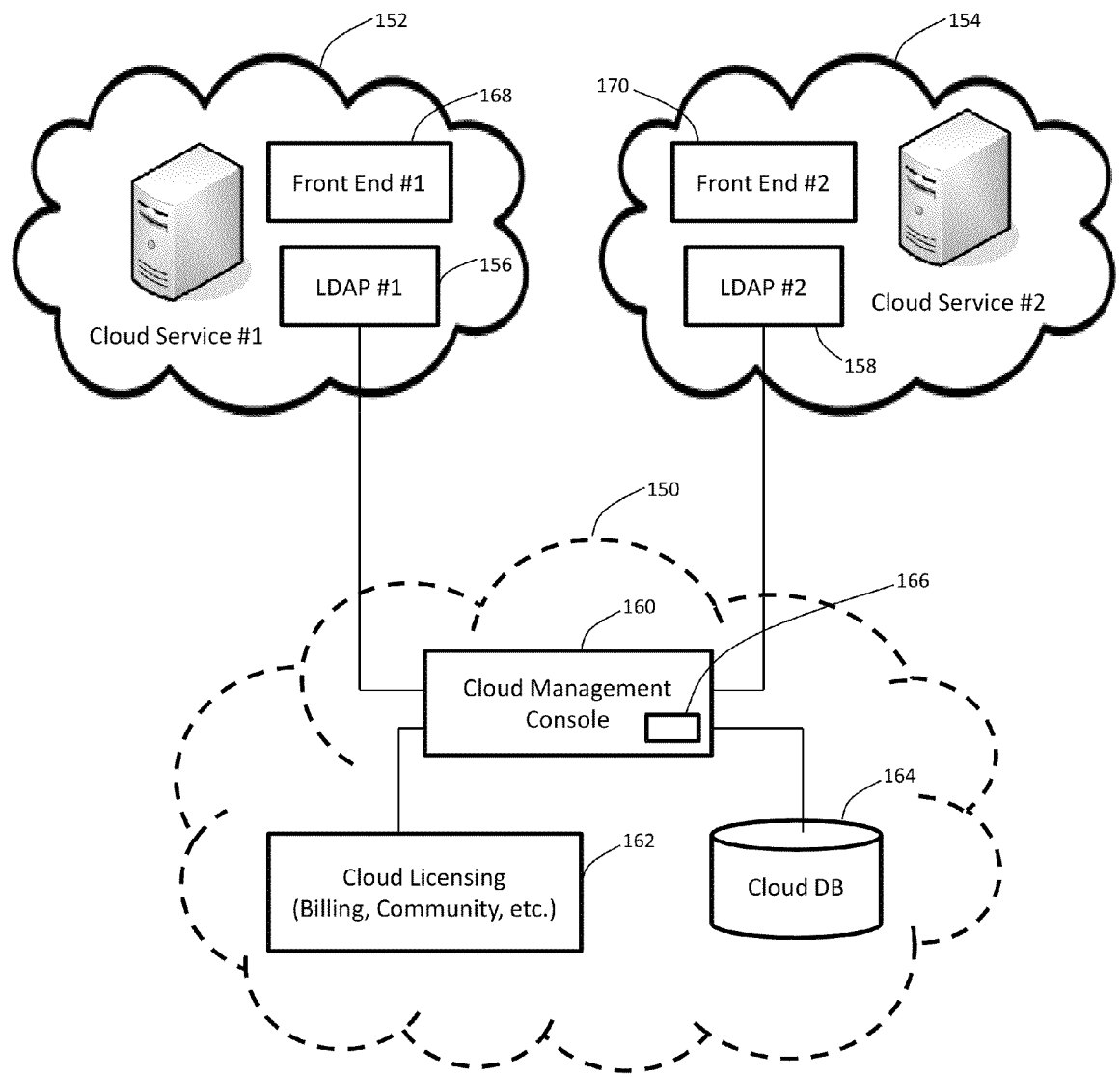
FIG. 4 shows a more detailed view of the self-provisioning and on-boarding engine communicating with two cloud services.

Referring to FIG. 4 there is shown a more detailed view of the on-board provisioning system 150, which includes the self-provisioning system and on-boarding engine that is used to deploy, manage and configure public, private and hybrid cloud deployments.

The on-board provisioning system 150 includes a cloud management console 160 that is communicatively coupled to the LDAP directory services 156 and 158 that are associated with cloud services 152 and 154, respectively. The first cloud service includes a first LDAP directory that manages end users accessing the first cloud service. The second cloud service includes a second LDAP directory configured to manage end user's access to the second cloud service.

In the illustrative embodiment, the on-board provisioning system 150 is configured to communicate with both cloud services and provides a back-end group of services that include the cloud management console 160, the cloud licensing module 162 and the cloud database 164. The cloud management console 160 is communicatively coupled to the cloud licensing module 162 and the cloud database module 164.

The cloud management console 160 communicates with one or more invitations to end users, which enables them to access one of the first cloud service 152 and the second cloud service 154, when each end user accepts his/her respective invitation. A synchronization module 166 enables the database 164 to synchronize with each of the LDAP directories according to each end user's accepted invitations and the licensing terms for accessing one or more of the cloud services 152 and 154.

By way of example and not of limitation, the illustrative cloud database 164 is a relational database that manages and communicates with the individual LDAP directories 156 and 158. Additionally, the relational database 164 can be configured to interface with billing systems, websites, and/or social networks. Thus, the "centralized" database 164 is configured to communicate with a plurality of LDAP directories. The cloud database 164 may also be configured to receive a global user profile and to track invitations that are communicated to the end users. By way of example and not of limitation, the global end user profile stored on the database includes data fields that can be communicated to at least one of the first cloud service and the second cloud service.

The illustrative cloud management console 160 operates using a directory service such as Microsoft® Active Directory. The illustrative Active Directory provides a central location for network administration and security. The illustrative Active Directory also includes a domain controller that authenticates and authorizes all end users and computers in a Windows domain-type network by assigning and enforcing security policies for all computers and installing or updating software.

For example, the cloud management console 160 is configured to group Administrators and/or end users into Organizational Units (OUs). These Organizational Units are structured hierarchically as described in further detail in FIG. 5.

The cloud management console 160 also includes the synchronization module 166 that can be used to synchronize various cloud services across various cloud deployments. Furthermore, the synchronization module 166 can integrate with cloud services that manage virtual machines, storage, and network resources while enforcing compliance with licensing policies. The synchronization module 166 also enables the database to synchronize with each of the LDAP directories according to end user's accepted invitations to at least one of the first per seat license and the second per seat license.

In another embodiment, the cloud management console 160 manages the relational database 164 that identifies a maximum number of end users that can access each cloud service and an end date for accessing each cloud service. The global user profile is stored on the relational database, and relational database performs the operations of the synchronization module 166. In yet another embodiment, the synchronization operations may also be performed by the cloud licensing module 162.

In an alternative embodiment, the on-board provisioning system 150 may also be applied to premises based installations. For example, the hierarchical Administrator framework may also reside on a premised based server such as Microsoft® IIS server along with a SQL server.

In operation, the on-board provisioning system 150 provides a method of managing a plurality of cloud services for a plurality of end users. The method includes communicating an invitation from the cloud management console 160 to the plurality of end users. The invitation receives a user input via at least one BYOD client 118 that enables the end user to access at least one of a first cloud service and a second cloud service.

Access to the first cloud service and/or second cloud service is managed by the cloud management console 160. The database 164 is communicatively coupled to the first LDAP directory 156 and the second LDAP directory 158. By way of example and not of limitation the database 164 is relational database such as a MySQL database.

The cloud licensing module 162 or database 164 may be configured to identify a maximum number of end users that can access each cloud service and an end date for accessing each cloud service.

The global user profile includes data fields configured to be communicated to at least one of the first cloud service and the second cloud service. In the illustrative embodiment, the database 164 stores the global end user profiles. Alternatively, the cloud licensing module 162 may store the global end user profiles.

In the illustrative embodiment, the relational database 164 synchronizes with each of the LDAP directories according to end users accepted invitations to at least one of the first per seat license and the second per seat license.

The method of managing cloud services may also include establishing an Organizational Unit that includes a plurality of end users that have permission to access at least one of the first cloud service 152 and the second cloud service 154. The Organizational Unit may be set up by an Administrator as described in further detail below.

The cloud management console 160 may also enable the Administrator to control the relational database and the Organizational Unit so that the Administrator can communicate a plurality of invitations to the Organizational Unit. For example, the method may include enabling a first-tier Administrator to identify a community and an upper limit of users that can belong to the community, and selecting a second-tier Administrator that is capable of creating at least one Organizational Unit that is a subset of the end users within the community. Furthermore, the second-tier Administrator may communicate the invitations to the Organizational Unit. Further still, the method of managing cloud services may include communicating the global user profile data fields stored on the database 164 to at least one of the first LDAP directory 156 and the second LDAP directory 158, when the invitations is accepted by the end user.

Figure 5:
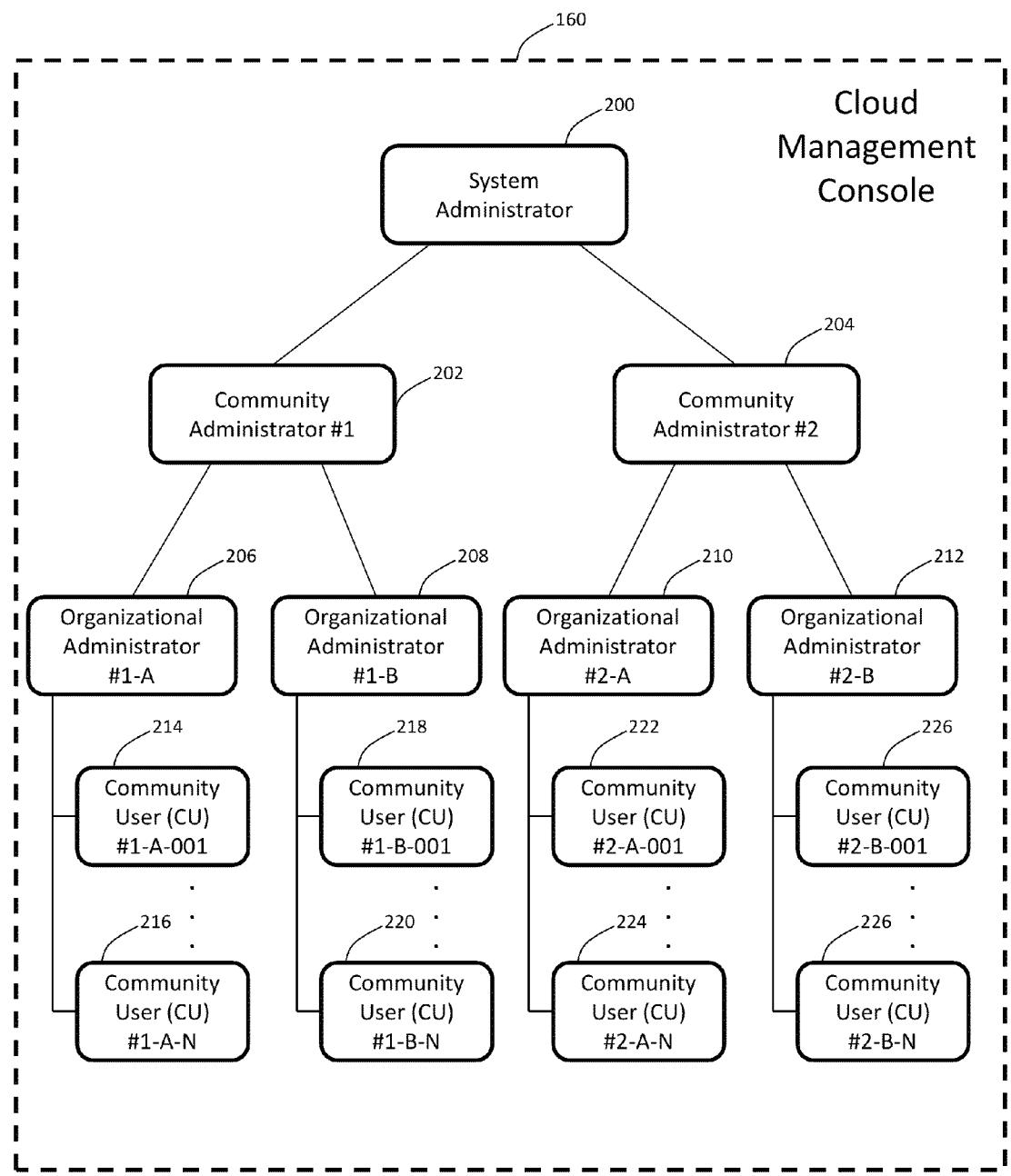
FIG. 5 shows a cloud management console having a hierarchical network Administrator framework for controlling per seat licenses for cloud services.

Referring to FIG. 5 there is shown a cloud management console 160 having a hierarchical network Administrator framework for controlling per seat licenses for cloud services. The hierarchical network Administrator framework can also be used to control access to an enterprise software program on a premised-based server.

The illustrative cloud management console 160 has a hierarchical network Administrator framework that includes a first-tier Administrator that is referred to as a System Administrator (SA), a second-tier Administrator referred to as a Community Administrator (CA), a third-tier Administrator referred to as an Organization Administrator (OA), and a plurality of end users referred to as Community Users (CUs).

Generally, the first-tier Administrator identifies a community and an upper limit of end users that can belong to the community. The second-tier Administrator is selected by the first-tier Administrator and creates at least one Organizational Unit that is a subset of the end users within the community. The third-tier Administrator is selected by the second-tier Administrator and can add end users to the Organizational Unit. Each end user is presented with a user interface (UI) that includes all the Organizational Units. By way of example and not of limitation, each Organizational Unit corresponds to a particular enterprise software program.

The cloud management console 160 is part of the on-board provisioning system 150. The cloud management console 160 may be embodied as a standalone module 160 that includes a synchronization module 166, as a relational database 164 having the appropriate schema, as an independent cloud licensing module 162, or as a combination thereof.

In general, the operations performed by the cloud management console are related to supporting a hierarchical network Administrator framework that controls access to cloud service in a manner consistent with the per seat licensing requirements for the cloud services.

More particularly, the cloud management console 160 enables a System Administrator (SA) 200 to create new communities, edit communities, and delete communities. The SA 200 has a relatively broad set of rights and privileges. In the illustrative embodiment, the SA can assign a more limited set of rights (than the SA rights) to the Community Administrator (CA) 202 and 204. The SA can also create at least one Organizational Unit that is a subset of end users within the community.

In the illustrative embodiment, the hierarchical network Administrator framework is operatively coupled to the database 164 (shown in FIG. 4) that the first-tier Administrator (System Administrator) controls by identifying the community and the upper limit of end users that can belong to the community. Simply put, the first-tier Administrator (SA) provides the second-tier Administrator (CA) and third tier Administrator (OA) with limited access to the database 164.

The illustrative embodiment also includes an invitation communicated from one of the Administrators to an end user, in which the invitation enables the end user to access the enterprise software program when the end user accepts the invitation. Depending on the assigned privileges or rights, either the SA or CA can remove end users from the community when the end user does not accept an invitation communicated from one of the Administrators. Additionally, at least one group that is a subset of the Organizational Unit and either the SA or CA is capable of adding end users to the group depending on the assigned privileges or rights.

The system may also include a per seat license to the enterprise software program, wherein the license includes the upper limit of end users that can access the enterprise software program. In the illustrative embodiment, the licensing is managed by a cloud licensing module 162, which also includes an end date for the per seat license.

The hierarchical network Administrator framework system may also support a group that is a subset of the Organizational Unit so that the third-tier Administrator may add or remove end users from the group. The third-tier Administrator (OA) may also remove users from the community when the end users do not accept an invitation communicated from the Administrator to the end user, in which the invitation enables the end user to access the enterprise software program. In the illustrative embodiment, the second-tier Administrator can also add or remove end users from the Organizational Unit.

In the illustrative embodiment, the SA has assigned Community Administrator #1 202 and Community Administrator #2 204 with the rights to administrate an Organizational Unit (OU). Additionally, the Community Administrator (CA) can impose a maximum end user limits and service expiration dates for the Organizational Unit. The CA can also create Groups within an organization, e.g. a "sales" group and a "support" group. The Community Administrator may also assign end users to the Organizational Unit and Group. The Community Administrator can also add new end users to the community.

The Community Administrator may also assign an even more limited set of rights (than the CA rights) to an Organizational Administrator (OA). The Organization Administrator (OA) is assigned to administrate their organization. The Organizational Administrator may also add end users to the Organizational Unit or remove end users from the Organization Unit. The Organization Administrator can also add, delete and remove end users from a Member Distribution Group. Additionally, the OA can also reset passwords and create new passwords. Thus, the CA may assign the right to administrate an Organizational Unit to the Organizational Administrator.

In FIG. 5, the Community Administrator 202 assigns rights to Organizational Administrator 206 and 208, and CA 204 assigns rights to OA 210 and OA 212. Each Organizational Administrator has management and control over their respective Organization Unit, which includes at least one Community User (CU). For example, OA 206 has management and control over community users 214 and 216; OA 208 has management and control over CU 218 and 220; OA 210 has management and control over CU 222 and 224; and OA 212 has management and control over 226 and 228.

The Community User (CU) is the end user that may have access to the cloud service. In operation, the Community User is presented with a User Interface (UI) that includes the Communities that are available to the particular user. By way of example, the UI may be a cloud management console that is also available to System Administrators, but without the CU having Administrator privileges. See FIGS. 8A-8G for further detail. Additionally, the CU can view the Community setting and configuration information. Once the CU has accepted the invitation, the CU can download software that is available to the user's community.

Generally, the Community User can view, add, edit, and delete personal meeting rooms. Additionally, the Community User can view, add, and edit personal profile information and change his/her password. Thus, when a user authenticates to the Cloud Management Console (CMC), the user is able to see all of the managed Communities that they belong to. Additionally, the user can see the configuration parameters to configure their Unified Communications Client to authenticate to each server. Furthermore, the user can see all configuration information necessary to utilize the features of that community, such as Broadsoft Plugin installation and settings, Polycom video conferencing plugins and settings, Desktop SIP phones and more.

Figure 6A:
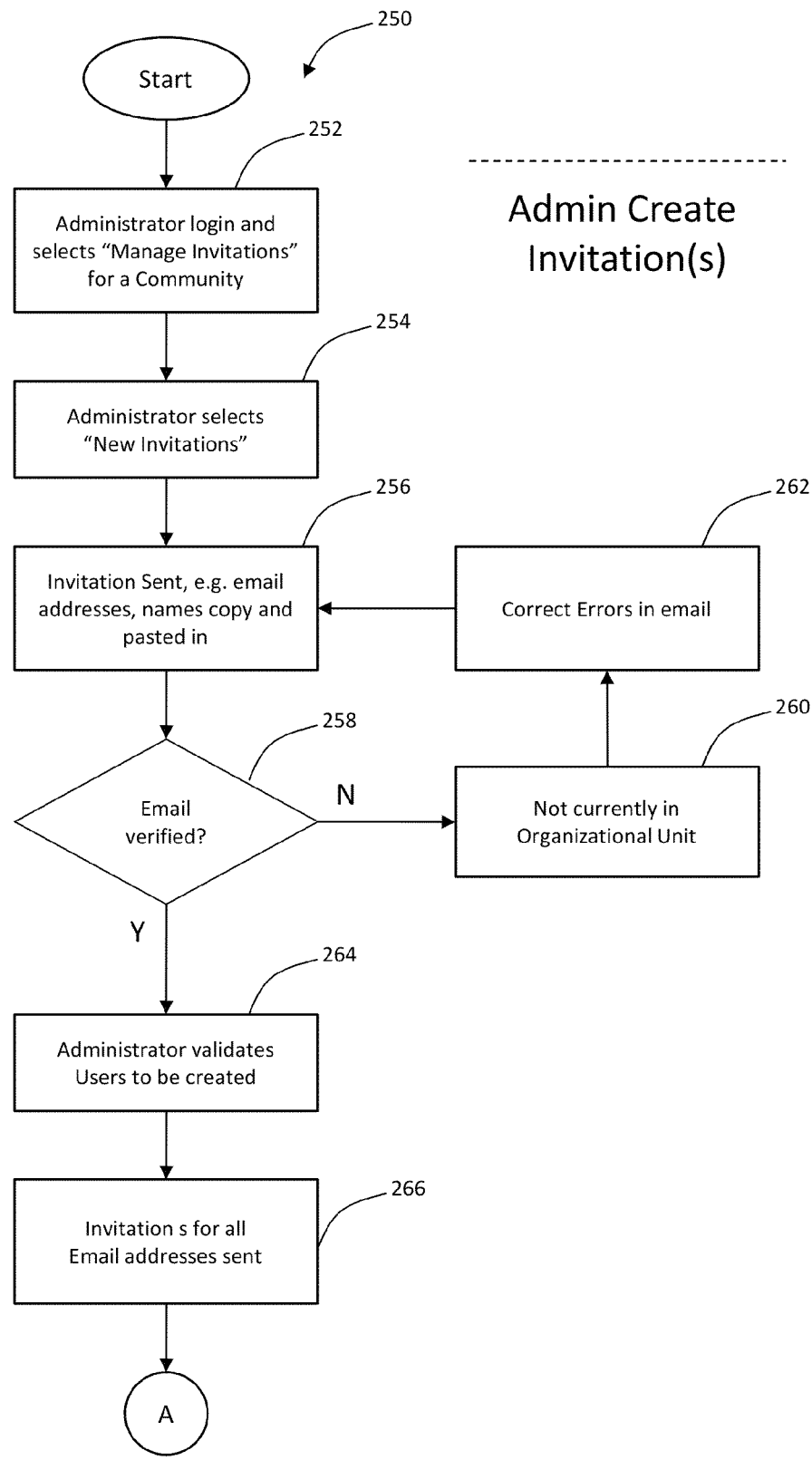
FIGS. 6A and 6B show a flowchart of an Administrator creating invitations and a user accepting the invitation.

Referring to FIG. 6A there is shown a flowchart showing how an Administrator can create invitations. Generally, the invitations created by the Administrator are sent to the verified email addresses. In so doing, the "on-boarding" end user creates his/her own username and password. Thus, instead of having a system Administrator create the username and password for each user, the Administrator role is limited to sending invitations to validating users.

The method for having an Administrator create invitations is initiated at block 252 where the Administrator logs in and selects the illustrative "Manage Invitations" link, which lets the Administrator manage and control invitations for a particular community. The method proceeds to block 254 where the Administrator selects "new invitations" and begins to engage with an illustrative web page.

At block 256 an invitation is sent via e-mail, for example. Alternatively, the invitations may be sent by embedding a "link" in an SMS message, MMS message, in a chat window, or other such methods for communicating the link.

At decision diamond 258, the e-mail is verified. The e-mail address is verified if it is part of the Organizational Unit. The verification process compares the e-mail being sent to e-mail addresses corresponding to the Organizational Unit, which are stored in the cloud database 164. If the e-mail address is not verified because the e-mail is not part of the Organizational Unit, the method proceeds to block 260 where the determination results in the need to correct the e-mail error at block 262 by adding the e-mail address to the Organizational Unit. The corrected e-mail address, which is now part of the organization unit, can then be verified at decision diamond 258.

After the e-mail addresses have been verified, the method then proceeds to block 264 where the appropriate Administrator validates the users. The invitations are then sent to the validated users at block 266.

Figure 6B:
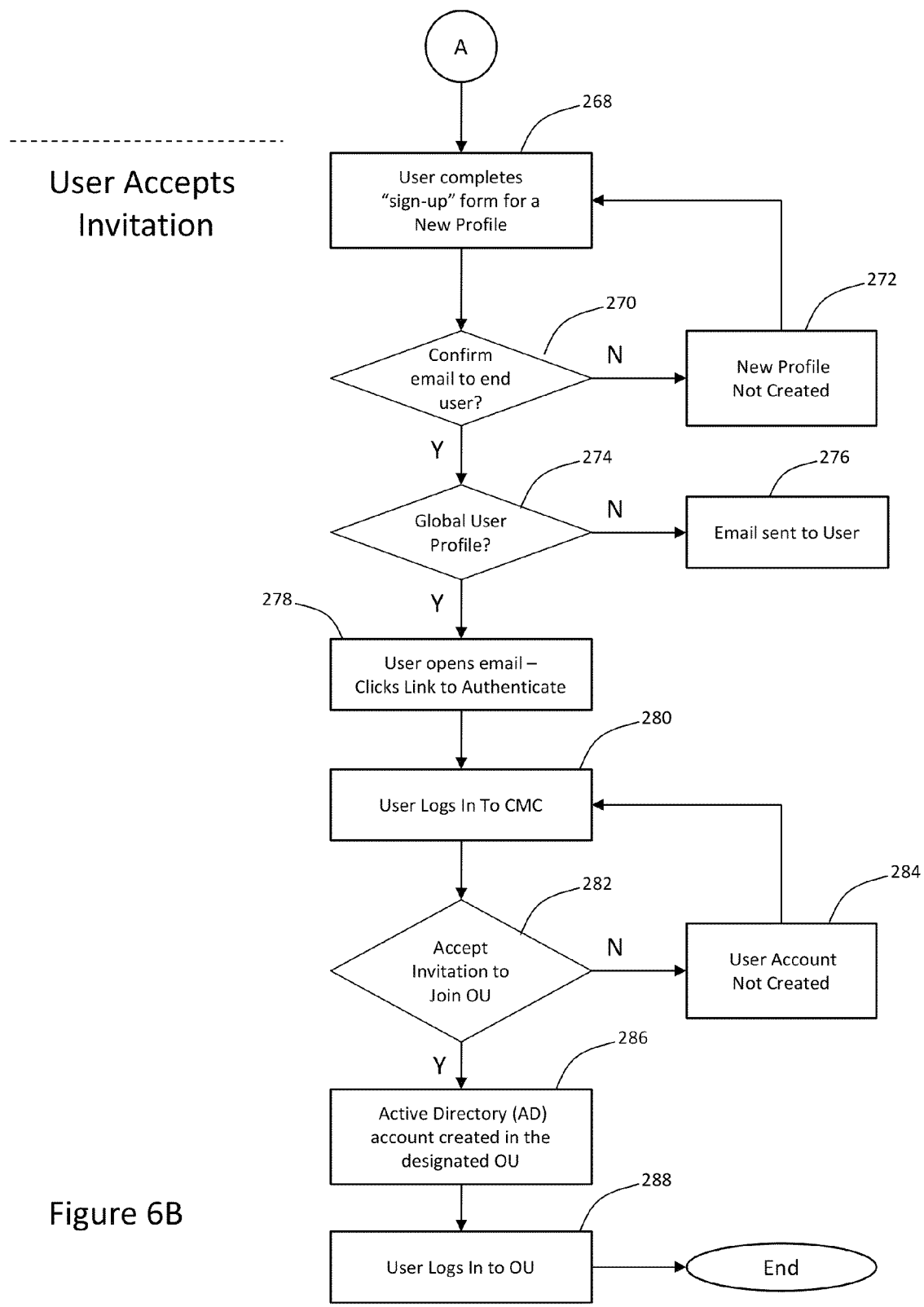

Referring to FIG. 6B, there is shown an illustrative verified user accepting an invitation from an Administrator after the invitation are sent. The illustrative verified user can belong to one or many Organizational Units. As described in further detail below, the invitations may be communicated to a global user profile, which enables the user to accept a plurality of invitations (corresponding to different Organizational Units) from a single account corresponding to the end user's global user profile. Thus, the invitations enable the end user to accept invitations for a plurality of Organizational Unites from a single global user profile account.

Before the user accepts an invitation, the user completes a sign-up form for a new profile at block 268. At decision diamond 270, a confirmatory e-mail is sent to the end user. If the confirmatory e-mail is not received by the end user this indicates that the new profile was not properly created as represented by block 272, and the user must repeat the sign up process at block 268.

If the confirmatory email is received by the end user, the method proceeds to decision diamond 274 where a determination is made whether the end user has a global user profile. If the user does not have a global user profile, then the method proceeds to block 276 where an email is sent to the user. The email sent to the user at block 276 may include an invitation that allows a user to have access to a particular cloud service.

Figure 8A:
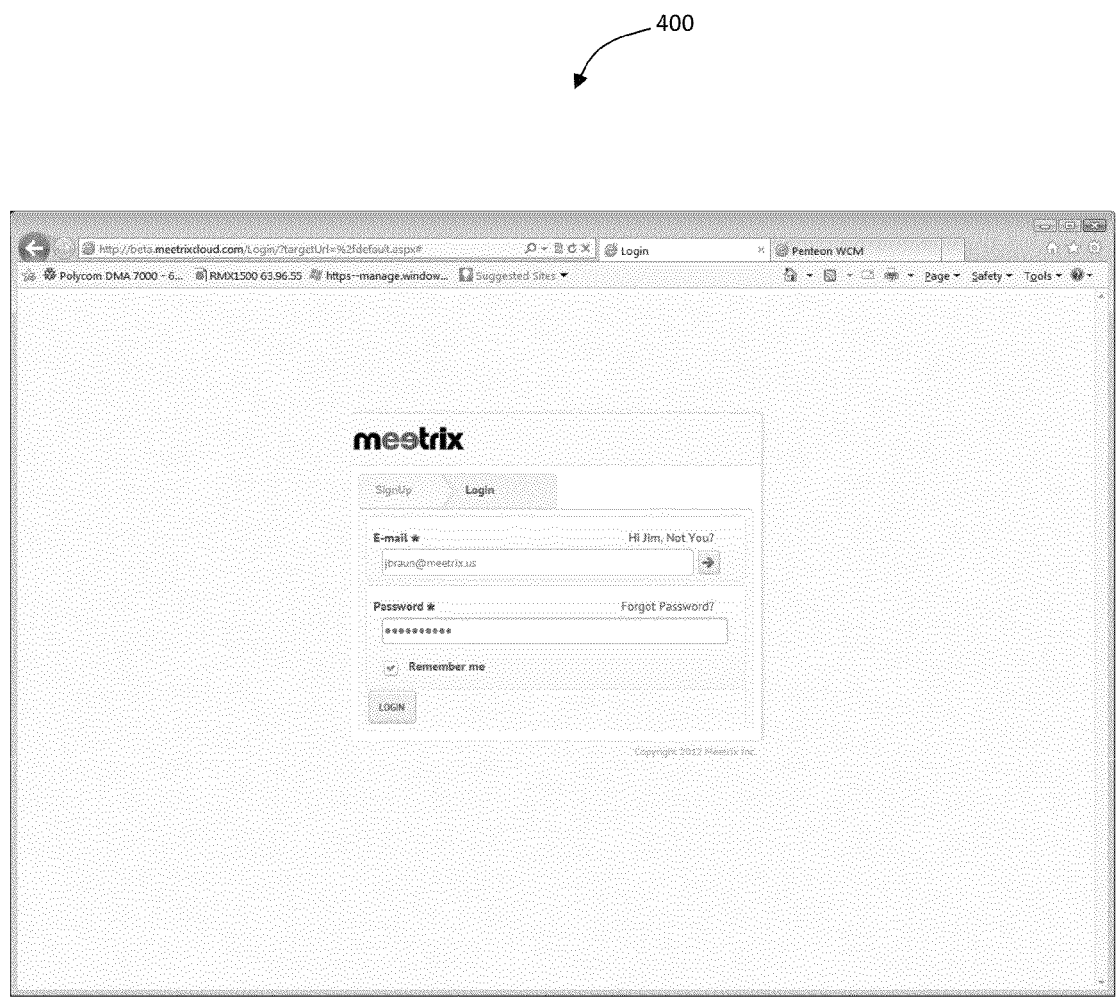
FIG. 8A shows a login web page for accessing a cloud management console.
Figure 8B:
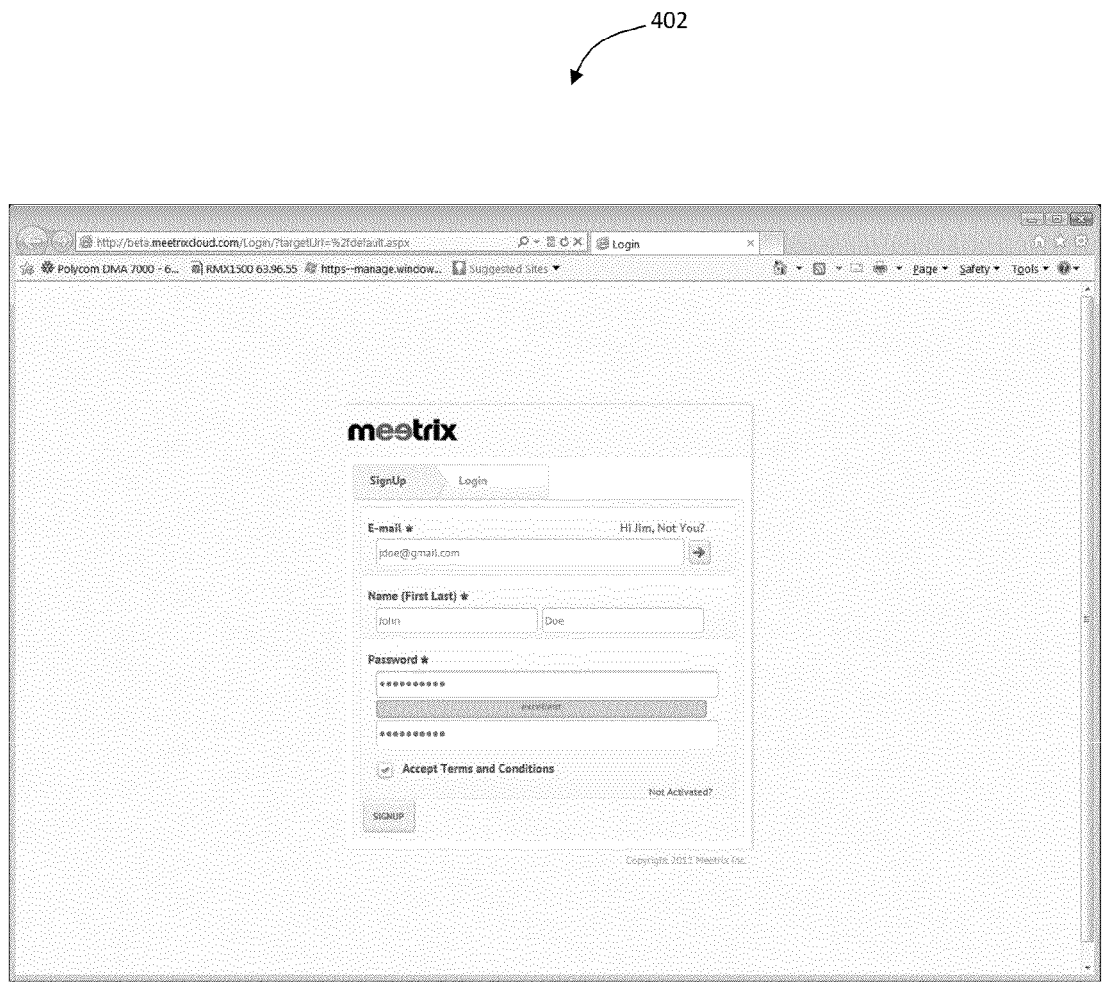
FIG. 8B shows a sign-up for a new user to access the cloud management console.
Figure 8C:
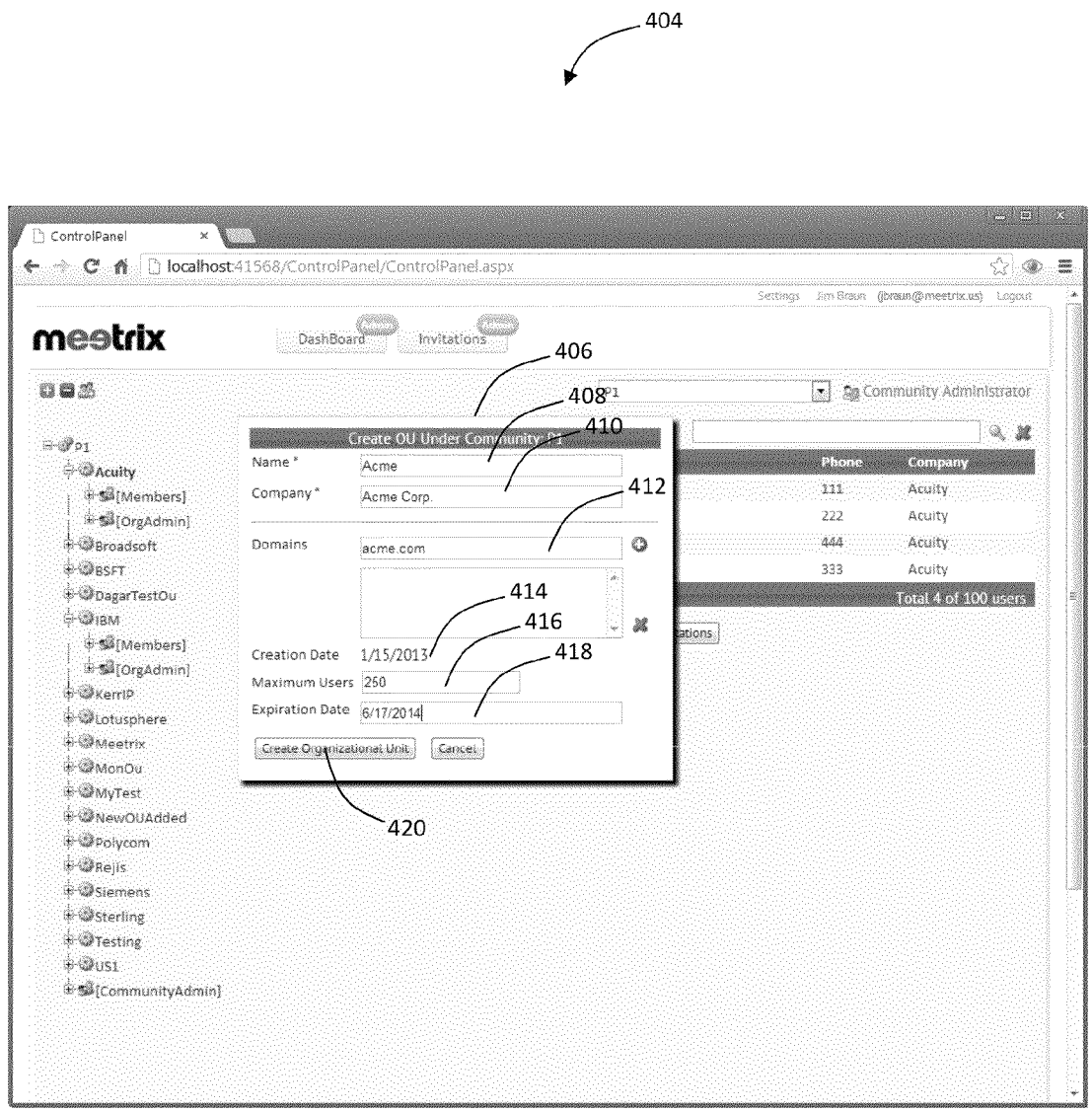
FIG. 8C shows a screenshot of a user interface that is used to create an Organizational Unit.
Figure 8D:
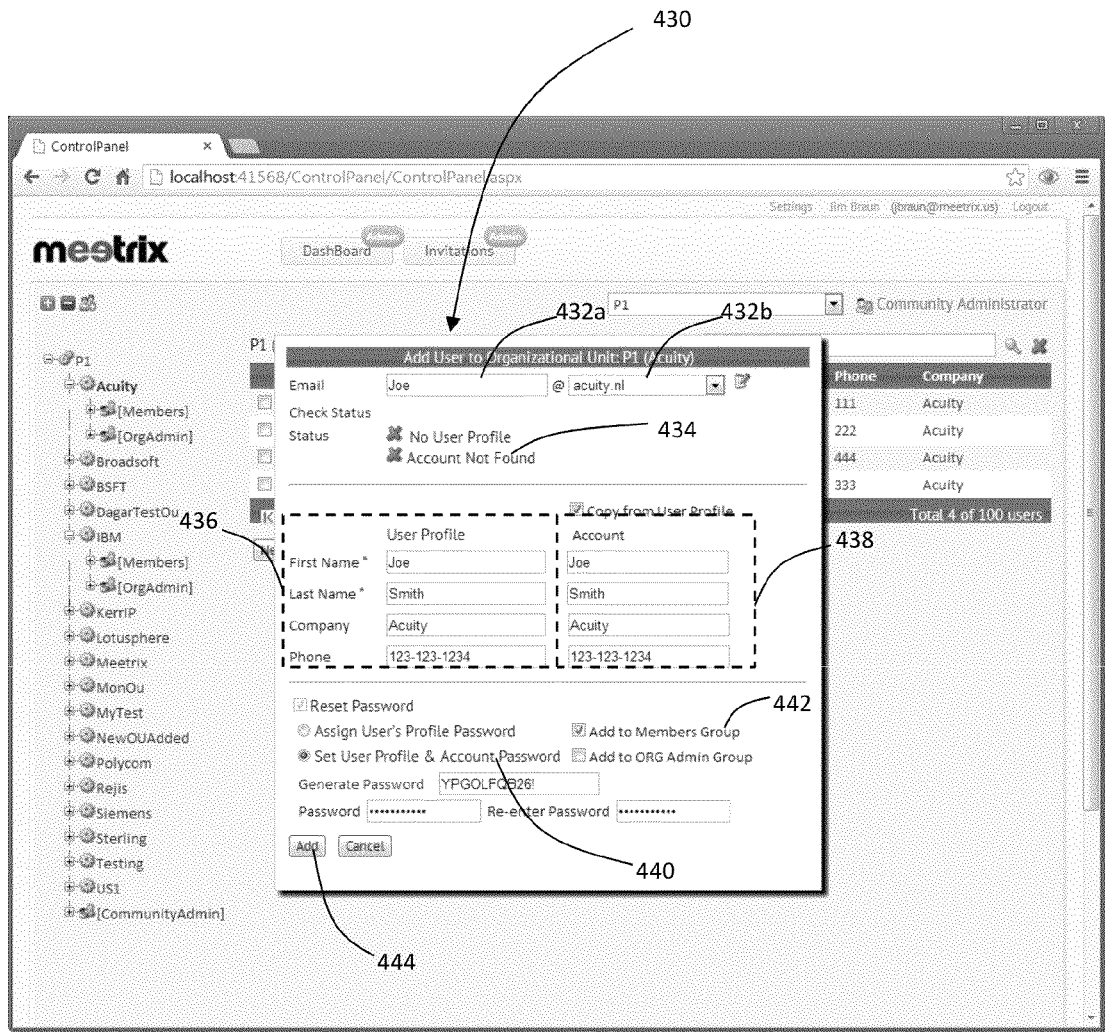
FIG. 8D shows a user interface for building a global user profile.
Figure 8E:
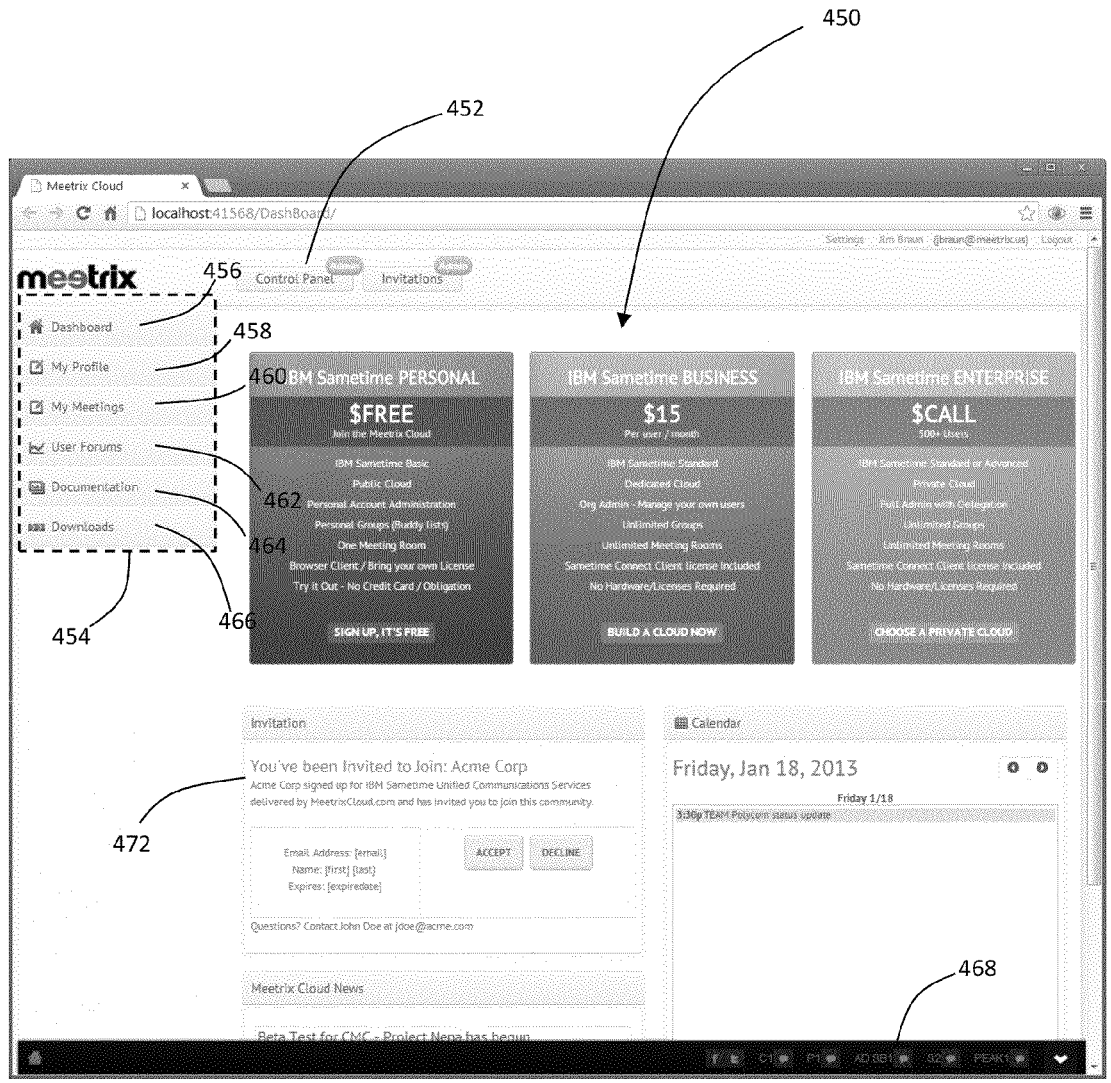
FIG. 8E shows a home page that includes a dashboard.

At block 276, the user has elected to be part of an Organizational Unit—instead the end user has elected to access the illustrative cloud service without the benefit of accessing a Control Panel 452 as shown in FIG. 8E. Thus, the user will have to access each cloud service individually.

If the end user does possess a global user profile, the method proceeds to block 278 where the user opens their e-mail, which includes an invitation. When the user clicks the link, the end user can be taken to a web page that requires the user to login to the Control Panel 452 represented by block 280.

After logging in to the Control Panel 452, the end user has to make a decision whether to accept an invitation to join an Organizational Unit at decision diamond 282. If the end user decides not to accept the invitation, the user can return to the Control Panel 452 and access other cloud services or to log out of the Control Panel at block 284.

If the user does accept the invitation, the method proceeds to block 286, where the illustrative Active Directory account is created in the designated Organizational Unit. At block 288, the end user is then permitted to login to the cloud service using the Cloud Management Console.

Figure 7:
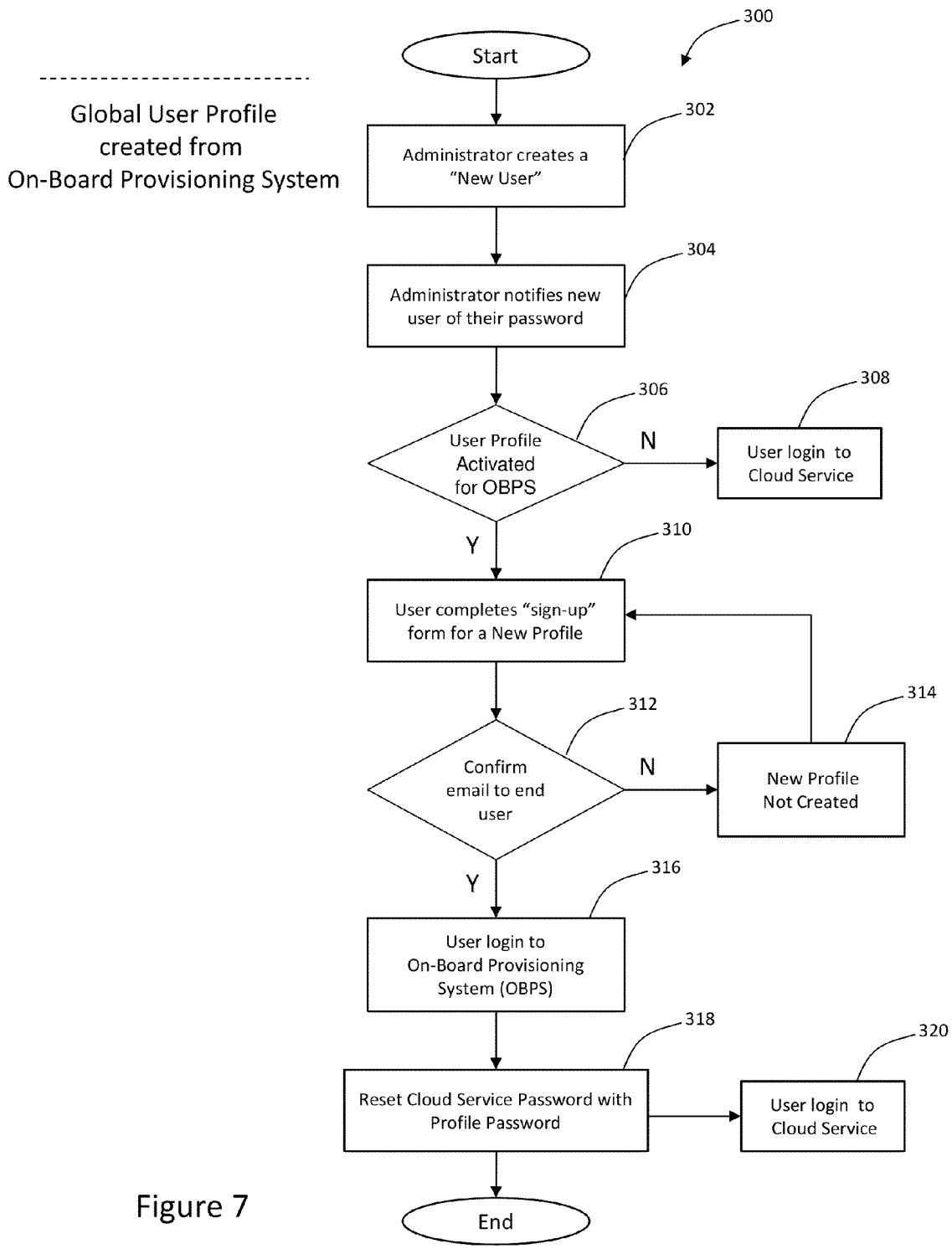
FIG. 7 shows the generation of a global user profile.

Referring to FIG. 7 there is shown a flowchart 300 of a global user profile created from Control Panel 452. The flow chart presents a migration from a traditional approach of creating a username and password to a global user profile that is part of the on-board provisioning system 150. Basically, the global user profile enables the end user to login to a multiplicity of cloud services through the global user profile, i.e. a single user profile.

The process of generating a global user profile is initiated at block 302 by having an Administrator create a new user within the Administrator Control Panel. The Administrator may be one of a System Administrator, a Community Administrator, and an Organizational Administrator, The Administrator then proceeds to notify the new user of his password at block 304. The method then proceeds to decision diamond 306 where the on-board provisioning system 150 determines whether to activate the new global user profile. The on-board provisioning system 150 includes a plurality of rules that determined whether the new global user profile satisfies the requirements to access the on-board provisioning system 150. Additionally, the end user may decide not to login to the cloud service using the Control Panel. Instead the user proceeds to block 308 where the user logs in to the cloud service without using the on-board provisioning system 150.

If the end user decides to generate a global user profile using the on-board provisioning system 150, the method proceeds to block 310 where the user completes a sign-up form for a new global user profile. The method then proceeds to decision diamond 312 where a confirmatory e-mail is sent to the end user. If the confirmatory e-mail is not received by the end user this indicates that the new profile was not properly created as represented by block 314, and the user must repeat the sign up process at block 310.

If the confirmatory e-mail is received by the end user, the method proceeds to block 316 where the user can login to the Control Panel 452 associated with the on-board provisioning system 150. At block 318, the community end user has the option to reset the cloud service password with a global user profile password. At block 320, the community end user may then login to the cloud service.

Referring to FIG. 8A there is shown an illustrative login web page 400 that is used by end users and Administrators for accessing the Cloud Management Console 150. In FIG. 8B there is shown a sign-up page 402 for a new user. The illustrative sign up page enables the user to begin the process of creating their global user profile.

After the user login, the user is presented with a dashboard that includes a "my profile" section, a "my communities" section, a "my meetings" section. The user login process is performed with an invitation from an Administrator. For example, the invitation may be sent via e-mail, which includes a link to the meeting room. The user may be registered or may be a guest. The registered user must input a user name and password.

Figure 8F:
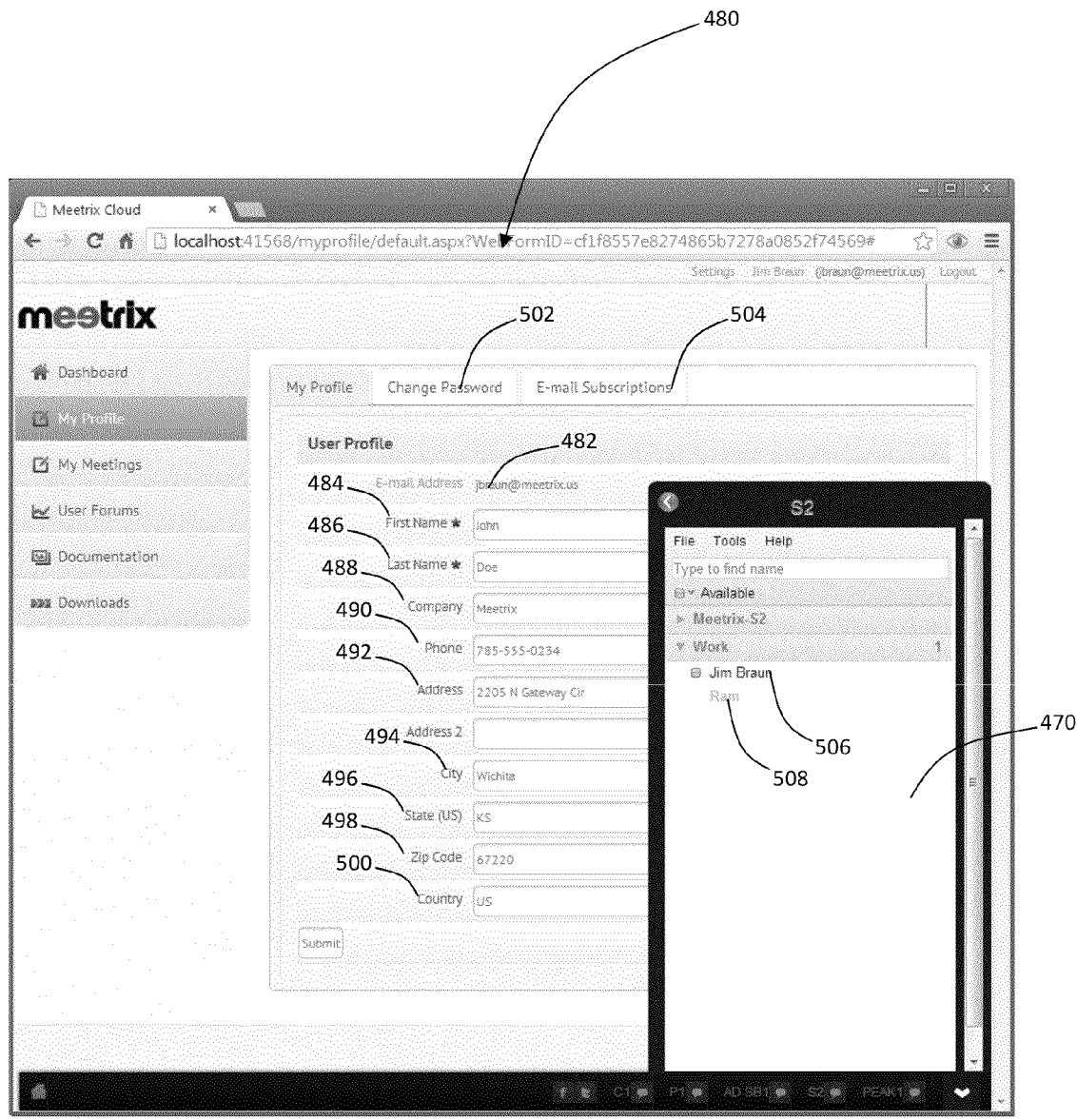
FIG. 8F shows an illustrative screenshot of the global user profile.
Figure 8G:
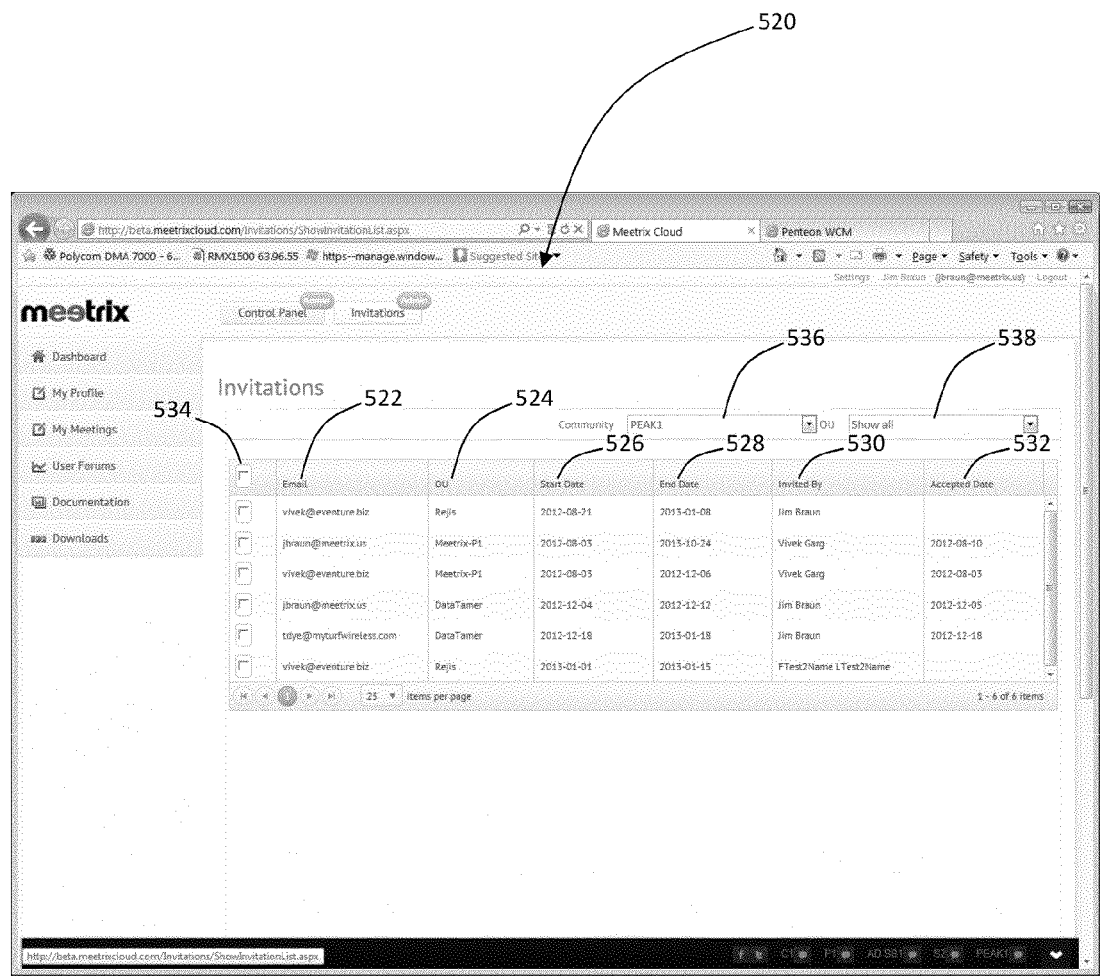
FIG. 8G shows an Administrator page, in which the Administrator can control the invitations sent to end users.

When logging in as an Administrator, the Administrator is provided with access to a Control Panel 452 (shown in FIG. 8E) and to the Invitation Management 520 module (shown in FIG. 8G).

Referring to FIG. 8C there is shown a screenshot 404 of a UI that is used to create an Organizational Unit by a Community Administrator, who is also referred to as a second-tier Administrator. The illustrative Organizational Unit is created by identifying a particular community, which in FIG. 8C is "P1," as represented by window 406. The illustrative community P1 is created by the system Administrator (also referred to as the first-tier Administrator) where the community has access to the cloud service subject to an upper limit of users that can belong to the community according to a community per seat licensing.

As described above, a Community Administrator (second-tier Administrator) is selected by the System Administrator. The Community Administrator is capable of creating at least one Organizational Unit (OU) that is a subset of the end users within the community. The Community Administrator can also add end users to the Organizational Unit. A user interface is displayed that includes all the Organizational Units, wherein each Organizational Unit corresponds to a particular cloud service.

In screenshot 404, the illustrative Community Administrator proceeds to fill in the illustrative fields that include name 408, company 410, domains 412, creation date 414, maximum users 416, and expiration date 418. The Community Administrator then proceeds to create the organization unit by selecting "create Organizational Unit" button 420.

With the maximum user 416 and expiration date 418 attributes, the illustrative Community Administrator can generate an upper limit of end users that and an end date that represents a per seat license for accessing the illustrative "P1" cloud service. In the illustrative embodiment, the per seat license is associated with an Organizational Unit, e.g. Acme.

To the left of window 406 there is shown a listing of other Organizational Units corresponding to Community "P1." In the illustrative embodiment, the Organizational Units are managed using a database such as a relational database. By way of example and not of limitation, the database may be associated with Active Directory that can be used to extend the database schema to write tools that enforce the number of users.

The use of a relational database to manage and control a variety of different Organizational Units and communities enables an Administrator to query users for the illustrative cloud service, without having to individually query an LDAP directory. For example, 100 Organizational Units may be queried in milliseconds by relying on SQL database query tools rather than the hours required to individually query each LDAP directory.

Generally, the database to be controlled by the System Administrator (first-tier Administrator). The System Administrator provides the illustrative Community Administrator (second-tier Administrator) with limited access to the database. In this illustrative embodiment presented in FIG. 8C, the Community Administrator has management and control of the Organizational Unit, which controls end user access to the cloud service.

Additionally, the Community Administrator (second-tier Administrator) may select an organizational Administrator (third-tier Administrator), which creates the organization unit; and the organizational Administrator has management and control of the Organizational Unit.

Referring to FIG. 8D there is shown a window 430, in which a user is added to an Organizational Unit (OU) by the community Administrator (second-tier Administrator). In the illustrative embodiment, the email of the user is included at fields 432a and 432b. A status determination is made at section 434 indicating that there is no user profile in the relational database and that no account has been found.

In the illustrative embodiment, the community Administrator retrieves a user profile 436 from the end user's sign up process (see block 310 in FIG. 7) and copies the user profile to create an account 438. Thus, the user profile generated by the user can be easily processed by the community Administrator and converted to a global user profile, which can be applied to a variety of cloud services.

The community Administrator then proceeds to "set user profile & account password" 440 and "add to members group" 442. The password may be a temporary password. When the community Administrator clicks the "add" button 444, the illustrative user "Joe Smith" is added to the Organizational Unit. The password at the bottom of UI can be a temporary password.

Referring to FIG. 8E there is shown a home page 450 for a user dashboard. The "user" may be a system Administrator (first-tier Administrator), a community Administrator (second-tier Administrator), an organizational Administrator (third-tier Administrator), or a community end user. The home page 450 enables the "user" to manage their account or accounts.

The home page includes a Control Panel 452 that is accessed by an Administrator such as one of a system Administrator, a community Administrator, or an organizational Administrator. The basic functions of the Control Panel include, but are not limited to, adding, editing and deleting an Organizational Unit; adding, editing and deleting a group; assigning and removing user membership to groups; and adding, editing, deleting and searching for "user" accounts.

The Control Panel gives the Administrator an aggregated view of all of the directories (LDAP servers) in the cloud, and/or deployed on the ground in a hybrid fashion. This Control Panel displays the view of these directories as it was synchronized in the database.

An illustrative SQL database is the primary reference to directory objects, and when created by the Control Panel, that object is considered to be a "managed" object. The object refers to a user, group, or other such object definition established within the illustrative SQL database. By way of example and not of limitation, when a new user is created in an Organizational Unit, it is added to the database, and the object is placed in the directory at the same time. If either the addition of the new user to the database fails or the placement of the object in the directory fails, the transaction is rolled back to its original state. If the process of adding the new user to the database succeeds and the user is placed into the illustrative Active Directory, the object is considered to be managed and synchronized.

On the top left side of the page 454 are a variety of "global" quick links including the dashboard 456, the global user my profile 458, my meetings 460, and various support quick links including user forums 462, documentation 464, and downloads 466.

In the illustrative embodiment, the "my meetings" 460 quick link directs the user to a unified communication solution that supports hosting virtual meetings. In "my meetings" 460 the user can add, edit and delete meeting rooms so that the user can manage all of their meetings even if they are not at their own workstation where the desktop client is installed. The "my meetings" page extends the functionality of web meetings by allowing the user to schedule a meeting with the community calendar. In the illustrative embodiment, when a meeting is scheduled there is a password that is only active when the meeting starts until it ends. In the illustrative embodiment, the cloud management console 160 checks in 15 minute intervals and enables meetings that are scheduled to start, and disables meetings scheduled to end in this interval so the persistent meeting may not be accessed over the Internet. Thus, "my meetings" 460 supports security for web meetings in cloud instances and simplifies the process of managing meetings.

A footer 468 at the bottom of the dashboard includes links to each community that the user belongs to. The footer 468, at the bottom right, supports a popup window from the lower right corner of the page (shown in FIG. 8F). A plurality of different cloud services that the user has already signed up for are presented at footer 468. In the illustrative embodiment, the user "jbraun" is signed into different cloud services that include Facebook®, Twitter®, C1 cloud service, P1 cloud service, AD SB1 cloud service, S2 cloud service and PEAK1 cloud service.

Referring now to FIG. 8F, there is shown the footer 468 and a window 470 corresponding to the S2 cloud service. The user can click on the cloud services in footer 468 and see what other users have already signed in to use the various cloud services. The illustrative cloud services may also be described as "instances" that can be accessed by the global "my profile" user. By way of example and not of limitation, the user may launch a web proxy client in an illustrative iFrame within the window 470 with an option to open the iFrame in a separate browser popup. Additional options in the original iFrame are provided for changing the user's account settings, and for resetting the password of the account for that community server.

Referring back to FIG. 8E, an invitation 472 is presented in lower portion of the middle of the page where the user has received an invitation to join a community of users for the IBM Sametime cloud service. The user may choose to accept the invitation or decline the invitation for the illustrative unified communication (UC) cloud service. The user may open the UC application and communicate and collaborate with other users in the organization.

For purposes of this patent, a UC application is defined as a single application that combines several communication capabilities including, but not limited to: instant messaging, presence awareness, telephony, web meetings, video and audio conferencing, e-mail, social media integration and more.

Referring to FIG. 8F there is shown an illustrative screenshot of the global user profile, which is present as a "my profile" on the illustrative web page 480. The global "my profile" includes attributes such as email address 482, a first name 484, a last name 486, a company 488, a phone 490, an address 492, a city 494, a state 496, a zip code 498 and a country 500. Additionally, the global user "my profile" page enables the user to change his profile password with password tab 502. Furthermore, with the e-mail subscriptions tab 504, the user is allowed to sign-up to email lists.

By way of example and not of limitation, the end user's profile is stored in the SQL database and is used to authenticate the user to the illustrative Cloud Management Console 160 web site. The password is stored encrypted in the database, but is decrypted to set an Active Directory account password without having to re-type it, or to log the user in with his profile password and current e-mail address.

In the illustrative embodiment, the active cloud services displayed at the bottom of the page, i.e. footer 468, include window 470 that corresponds to the "S2" instance. The user is able to access the illustrative S2 instance using the global user "my profile." By way of example and not of limitation, the illustrative S2 cloud service is a chat service that includes a list of people that are accessing the S2 cloud service. In the illustrative embodiment, the users accessing the S2 cloud service are "Jim Braun" 506 and "Ram" 508.

Referring to FIG. 8G there is shown an administrative page 520, in which the Administrator is able to manage the invitations for a specific community. The administrative page 520 is also referred to as the "invitations manager" page. The fields presented on the invitations manager page 520 include an email address column 522, an Organizational Unit (OU) column 524, a start date column 526, an end date column 528, an invited by column 530, and the accepted date column 532 by the end user. Additionally, a selection input 534 is presented on the left hand of the presented fields, which enable the Administrator to delete and select invitations.

The invitations manager page 520 also includes a pull-down menu 536 for the each community. The community drop-down menu 536 presents all the different cloud services managed by the illustrative Cloud Management Console 160 presented on a website. The organizational pull-down menu 538 is related to different Organizational Units (OUs) and clicking on the pull-down menu presents all the different Organizational Units that are associated with the particular community.

The invitations manager 520 allows Administrators to provision users in batches. In the illustrative embodiment, an Administrator can paste a list of the valid and active e-mail addresses into a text editor and the cloud management console 160 verifies that the end user is or is not in the directory and validates the email address. Additionally, a first name and last name can be added after the e-mail address, separated by commas (not shown). This list of users can come from the company's email system, an LDIF file from their current directory, and a spreadsheet.

Once the users have been accepted into the SQL table for invitations, the invitations manager 520 allows the Administrator to selectively choose a list of users to send a customizable email message. The illustrative email message (not shown) has a link to the login page of the Cloud Management Console 160, and brief instructions of how to sign up, login, and accept the invitation.

When the user accepts the illustrative invitation, a user account is created in the LDAP directory using the end user's global profile data and synchronized with the SQL database. The user status becomes that of a "managed" user.

In operation, the global user profile stored in the cloud management console 160 is used to authenticate to the cloud service such as a UC platform. The account in the LDAP directory corresponding to the illustrative cloud service is not created until the user accepts the Administrator's invitation. The account in the LDAP directory that is associated with a particular cloud service is created with global user profile password versus a random password generated by an Administrator, which makes it easier for the end user to manage his own account(s).

For example, the system Administrator may create a new managed group and name them the "SameTime Communities." As described above the system Administrator controls the database 164 (see FIG. 4) that is used to establish a community of users that can manage and use the software. The cloud management console enables the system Administrator to prevent the community Administrators (CA) from adding users beyond their contractual limit.

The cloud management console 160 may also support a BYOL (bring your own license) licensing model. A BYOL allows the end users to gain access and download desktop client software or plugins by completing an online registration form that places the responsibility of license ownership on the end user. Once accepted, and depending on the particular software's licensing agreement, the end user is either automatically granted access to the download, or an e-mail is sent to the designated Administrator to approve or decline the request.

The administrative page 520 also supports a "my communities" section (not shown) that allows a user to view settings and capabilities of each cloud instance such as a Sametime cloud service. The "my communities" section describes a setup process for a desktop client with the appropriate settings, URLs and ports for the client to connect to the server. The "my communities" section also provides the appropriate settings and instructions to configure an illustrative meeting server within connect client cloud services and plugins for other functions, such as Polycom video conferencing, Broadsoft VOIP calling and more. The "my communities" section includes pages that serve as a reference to each of the cloud services, and technical instructions to install and configure their software appropriately.

Figure 9:
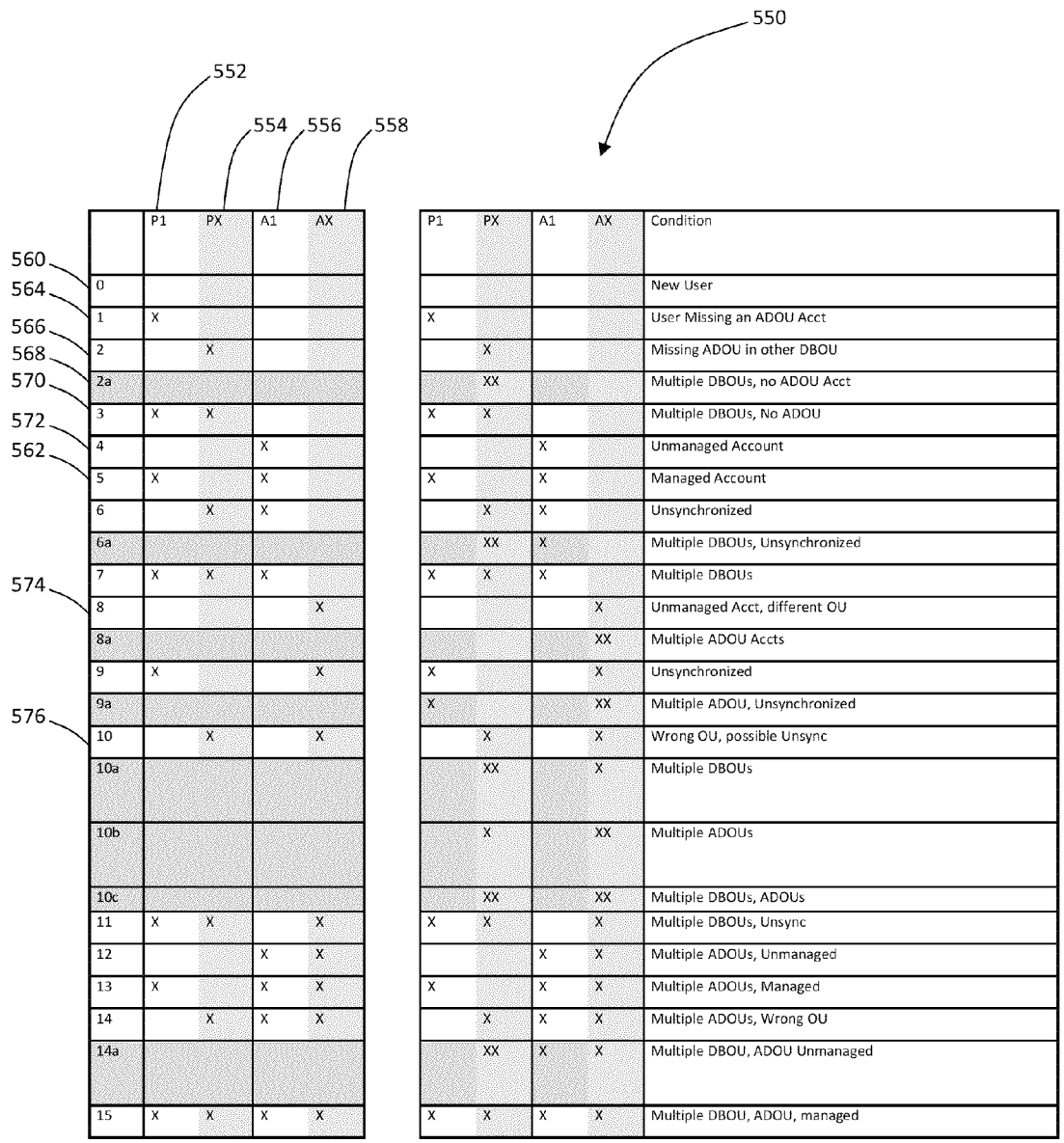
FIG. 9 shows an illustrative table of multiple entry states that are managed by the synchronization module associated with the cloud management console.

Referring to FIG. 9 and FIG. 4 there is shown illustrative synchronization table 550 that includes the multiple entry states that are handled by the cloud management console 160. More particularly, the synchronization table 550 reflects the various illustrative synchronization states corresponding to illustrative LDAP directories 156, 158 and illustrative SQL database 164 that are managed by illustrative synchronization module 166. As previously described, the SQL database 164 manages the multiple LDAP directories, and the SQL database 164 and illustrative LDAP directories 156 and 158 are managed by the synchronization module 166 associated with Cloud Management Console 160.

Although LDAP directories provide user interfaces that are supposed to prevent duplicate entries within the directory, it is possible to create that condition, either inadvertently or on purpose through the directory administration tools, or through APIs that operate on that directory. When these conditions occur, the CRON job that is performed for synchronization also handles multiple entry conditions by flagging them with a warning icon. The Administrator can resolve those conflicts using the Administrator's Control Panel, editing the user and resolving the conflict. Duplicate entries are not possible in the SQL database, since SQL enforces uniqueness at the system level.

In table 550 in FIG. 9, there are four different profiles. The first profile 552 "P1" is a profile corresponding to a particular database Organizational Unit (DBOU). The second profile 554 "PX" is a profile in a different database Organizational Unit (DBOU). The third profile 556 "A1" is an account in a particular Active Directory Organizational Unit (ADOU). The fourth profile 558 "AX" is an account in a different ADOU.

The various conditions 560 in FIG. 9 represent a variety of different states that total 24 illustrative conditions. Illustrative state 560 or condition "0" represents that there is a new user state, in which the new user has not been invited to a particular cloud service. State 562 or condition "5" represents a normal managed user.

In conditions "1" and "2" or states 564 and 566, the end user has signed up at the website and as such their information has been recorded in a particular DBOU. In condition "2a" and "3" or states 568 and 570, an error state is indicated that has the same user in multiple DBOUs. In condition 4 and 8 or states 572 and 574, there are unmanaged accounts in the Active Directory. In condition 10 or state 576, there are possible synchronization errors caused by the user, in which the user in the currently selected Organizational Unit. The other conditions or states represent synchronization or error conditions.

In operation, the cloud management console 160 uses a CRON job, or a timed recurring process, to query each of the LDAP directories for entries represented in the SQL database. Since the SQL database is primary, it iterates through each object, e.g. Organizational Unit, Group, User, etc., and validates that it exists and is synchronized. If by chance, a directory Administrator gains access to the directory console and deletes a "managed" user account, it will be flagged as "out of synchronization" and will appear with a red "X" icon in the directory listing. An Administrator can then edit or delete that record to resolve the synchronization error.

In addition, when a directory object's state is changed from the last time the CRON job was run, it is logged in the SQL database, effectively allowing an Administrator to re-create the directory from any point in time. This is also useful for billing systems and auditing purposes.

The on-board provisioning system and method described above is configured to interface with a variety of different cloud services, in which each cloud service may operate using a plurality of different standards. For illustrative purposes the on-board provisioning system and method is configured to interface with an illustrative UC cloud service. Illustrative UC cloud services include, but are not limited to, IBM® Sametime and Microsoft® Lync. These UC cloud services can be integrated with one another using a variety of different standards.

For example, native Secure Real-time Transport Protocol (SRTP) security may be used for multi-person video chats and meetings with Sametime. For standards-based telephony integration, Sametime also provides telephony integration through a middleware layer that provides connectivity to multiple telephone systems. The software connects through Session Initiation Protocol (SIP) to SIP-compliant PBXs from multiple vendors using SIP, and it connects to legacy TDM phone systems through SIP gateways. These standards may be configured to interface with the on-board provisioning system and method described in this patent.

The illustrative on-board provisioning system and method may also interface with video conferencing standards that include video CODECS such as H.323, H.264, WebRTC, SIP and SIP derivatives for video communications. Other standards that may be used for video conferencing include a Media Plane that controls the audio and video mixing and streaming. This Media Plane layer manages Real-Time Transport Protocols, User Datagram Packets (UDP) and Real-Time Transport Control Protocols (RTCP). The RTP and UDP normally carry information such as the payload type which is the type of CODEC, frame rate, video size and many others. The RTCP is a quality control Protocol for detecting errors during streaming.

Additionally, the on-board provisioning system and method may also interface with audio CODECS that include μ-law and a-law versions of G.711, G.722 which is a high-fidelity CODEC marketed as Polycom® HD Voice. Another illustrative popular open source voice CODEC includes Internet Low Bitrate CODEC, G.729, and similar audio CODECS.

Furthermore, the on-board provisioning system and method may also interface with Internet Protocol telephony or VoIP-SIP, Federated VoIP, and other VoIP protocols such as H.323, Media Gateway Control Protocol (MGCP), Session Initiation Protocol (SIP) Real-time Transport Protocol (RTP), Session Description Protocol (SDP), Inter-Asterisk eXchange (IAX), Jingle XMPP VoIP extensions, User Datagram Packets (UDP), and other such VoIP protocols.

The self-provisioning and on-board provisioning system with the integrated synchronization process is also platform agnostic and can work with a variety of hypervisors, and even in a single cloud deployment. The self-provisioning and on-board provisioning system with the integrated synchronization process is massively scalable and can be managed with a simple user-friendly interface as described above. It is also configured to implement industry-standard APIs from bodies such as the Distributed Management Task Force.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A system for managing on-boarding a plurality of cloud services, the system comprising:
    at least one first hardware processor associated with a first cloud service including a first LDAP (Lightweight Directory Access Protocol) directory configured to manage end users' accessing the first cloud service;
    a first per seat license to the first cloud service that includes a first upper limit of end users that can access the first cloud service and a first end date for the first per seat license;
    at least one second hardware processor associated with a second cloud service including a second LDAP directory configured to manage users' access the second cloud service;
    a second per seat license to the second cloud service that includes a second upper limit of end users that can access the second cloud service and a second end date for the second per seat license;
    a cloud management console communicatively coupled to the first LDAP directory and the second LDAP directory, wherein the cloud management console communicates a plurality of invitations to access at least one of the first cloud service and the second cloud service;
    at least one third hardware processor associated with a cloud database module associated with the cloud management console, the cloud database module receives a plurality of global user profiles, stores the communicated invitations, and stores the accepted invitations;
    the global user profile includes a plurality of data fields that are communicated to at least one of the first cloud service and the second cloud service;
    wherein acceptance of the invitation provides access to at least one of the first cloud service and the second cloud service; and
    a synchronization module associated with the cloud management console that enables the cloud database module to synchronize with each of the LDAP directories according to the accepted invitations for at least one of the first per seat license and the second per seat license so that the first upper limit of the first per seat licenses and the second upper limit of the second per seat licenses is not exceeded.

2. The system for managing on-boarding cloud services of claim 1 further comprising an Organizational Unit that is established by the Administrator, wherein the Organizational Unit includes a plurality of end users that have permission to access at least one of the first cloud service and the second cloud service.

3. The system for managing on-boarding cloud services of claim 2, wherein the cloud management console enables the Administrator to control the database and the Organizational Unit so that the Administrator can communicate a plurality of invitations to the Organizational Unit.

4. The system for managing on-boarding cloud services of claim 1 further comprising,
    a first-tier Administrator that identifies a community and an upper limit of users that can belong to the community; and
    a second-tier Administrator that is selected by the first-tier Administrator, wherein the second-tier Administrator is capable of creating at least one Organizational Unit that is a subset of the end users within the community.

5. The system for managing on-boarding cloud services of claim 4 wherein the second-tier Administrator communicates the invitation to each member of the Organizational Unit.

6. The system for managing on-boarding cloud services of claim 1 wherein the accepted invitation triggers communicating the global user profile data fields stored on the database to at least one of the first LDAP directory and the second LDAP directory.

7. The system for managing on-boarding cloud services of claim 1 further comprising enabling the Administrator to remove an end user from the community, when the end user does not accept the invitation communicated from the Administrator to the end user.

8. A system for managing on-boarding a plurality of cloud services, the system comprising:
    a first memory that stores a first cloud service including a first LDAP directory configured to manage end users accessing the first cloud service;
    a second memory that stores a second cloud service including a second LDAP directory configured to manage users access the second cloud service;
    a third memory associates with a relational database that is configured to be communicatively coupled to the first LDAP directory for the first cloud service and the second LDAP directory for the second cloud service, wherein the relational database memory stores a plurality of communicated invitations and a plurality of accepted invitations;
    a cloud management console that manages the relational database, which identifies a maximum number of end users that can access each cloud service and an end date for accessing each cloud service, the cloud management console configured to communicate the plurality of invitations to access at least one of the first cloud service and the second cloud service;

a global user profile stored on the relational database, wherein the global user profile includes a plurality of data fields configured to be communicated to at least one of the first cloud service and the second cloud service;

wherein acceptance of the invitation provides access to at least one of the first cloud service and the second cloud service;

a synchronization module associated with the cloud management console that enables the relational database to synchronize with each of the LDAP directories according to the accepted invitations for at least one of a first per seat license and a second per seat license so that the first upper limit of the first per seat licenses and the second upper limit of the second per seat licenses is not exceeded.

9. The system for managing on-boarding cloud services of claim 8 further comprising an Organizational Unit that is established by an Administrator, wherein the Organizational Unit includes a plurality of end users that have permission to access at least one of the first cloud service and the second cloud service.

10. The system for managing on-boarding cloud services of claim 9, wherein the cloud management console enables the Administrator to control the relational database and the Organizational Unit so that the Administrator can communicate a plurality of invitations to the Organizational Unit.

11. The system for managing on-boarding cloud services of claim 8 further comprising,
a first-tier Administrator that identifies a community and an upper limit of users that can belong to the community; and
a second-tier Administrator that is selected by the first-tier Administrator, wherein the second-tier Administrator is capable of creating at least one Organizational Unit that is a subset of the end users within the community.

12. The system for managing on-boarding cloud services of claim 11 wherein the second-tier Administrator communicates the invitation to each member of the Organizational Unit.

13. The system for managing on-boarding cloud services of claim 8 wherein the accepted invitation triggers communicating the global user profile data fields stored on the database to at least one of the first LDAP directory and the second LDAP directory.

14. The system for managing on-boarding cloud services of claim 8 further comprising enabling the Administrator to remove an end user from the community, when the end user does not accept the invitation communicated from the Administrator to the end user.

15. A method for managing on-boarding a plurality of cloud services, the method comprising:
communicating a plurality of invitations from a cloud management console, wherein the invitation is configured to receive a user input that enables an end user to access at least one of a first cloud service and a second cloud service;
managing access to a first memory that stores the first cloud service with a first LDAP directory that is associated with the first cloud service;
managing access to a second memory that stores the second cloud service with a second LDAP directory that is associated with the second cloud service;
enabling a third memory associated with a relational database to be communicatively coupled to the first LDAP directory for the first cloud service and the second LDAP directory for the second cloud service, wherein the relational database is associated with the cloud management module;
controlling the relational database from the cloud management console, which identifies a maximum number of end users that can access each cloud service and an end date for accessing each cloud service;
enabling the cloud management module to receive a plurality of accepted invitations, in which each accepted invitation provides access to at least one of the first cloud service and the second cloud service;
storing a global user profile on the relational database, wherein the global user profile includes a plurality of data fields configured to be communicated to at least one of the first cloud service and the second cloud service;
synchronizing the relational database with each of the LDAP directories with a synchronization module associated with the cloud management module, the synchronization module enables the relational database to synchronize with each of the LDAP directories according to the accepted invitations for at least one of the first per seat licenses and the second per seat licenses so that the upper limit of the first seat licenses and the second upper limit of the second per seat licenses is not exceeded.

16. The method of managing on-boarding cloud services of claim 15 further comprising establishing an Organizational Unit that includes a plurality of end users that have permission to access at least one of the first cloud service and the second cloud service, wherein the Organizational Unit is set up by an Administrator.

17. The method of managing on-boarding cloud services of claim 16 wherein the cloud management console enables the Administrator to control the relational database and the Organizational Unit so the Administrator can communicate a plurality of invitations to the Organizational Unit.

18. The method of managing on-boarding cloud services of claim 15 further comprising,
enabling a first-tier Administrator to identify a community and an upper limit of users that can belong to the community; and
selecting a second-tier Administrator that is capable of creating at least one Organizational Unit that is a subset of the end users within the community.

19. The method of managing on-boarding cloud services of claim 18 wherein the second-tier Administrator communicates the invitations to the Organizational Unit.

20. The method of managing on-boarding cloud services of claim 15 further comprising communicating the global user profile data fields stored on the database to at least one of the first LDAP directory and the second LDAP directory, when the invitation is accepted by the end user.

* * * * *